(12) United States Patent
Virtser et al.

(10) Patent No.: US 11,470,182 B1
(45) Date of Patent: Oct. 11, 2022

(54) MULTI-REGION CLOUD ARCHITECTURE

(71) Applicant: monday.com Ltd., Tel Aviv (IL)

(72) Inventors: David Virtser, Givatayim (IL); Daniel Mittelman, Tel Aviv (IL)

(73) Assignee: monday.com Ltd., Tel Aviv (IL)

( * ) Notice: Subject to any disclaimer, the term of this patent is extended or adjusted under 35 U.S.C. 154(b) by 0 days.

(21) Appl. No.: 17/565,687

(22) Filed: Dec. 30, 2021

Related U.S. Application Data

(60) Provisional application No. 63/251,769, filed on Oct. 4, 2021.

(51) Int. Cl.
| G06F 15/16 | (2006.01) |
| H04L 67/60 | (2022.01) |
| H04L 67/10 | (2022.01) |
| H04L 67/56 | (2022.01) |

(52) U.S. Cl.
CPC .............. *H04L 67/60* (2022.05); *H04L 67/10* (2013.01); *H04L 67/56* (2022.05)

(58) Field of Classification Search
CPC .......... H04L 67/32; H04L 67/10; H04L 67/28
See application file for complete search history.

(56) References Cited

U.S. PATENT DOCUMENTS

| 10,484,331 | B1* | 11/2019 | Rossman | H04L 63/0209 |
| 2015/0245160 | A1* | 8/2015 | Agrawal | H04L 41/145 |
| | | | | 455/406 |
| 2020/0244455 | A1 | 7/2020 | Teitzel | H04L 9/0897 |
| 2020/0358877 | A1* | 11/2020 | Zhao | H04W 4/50 |
| 2021/0044540 | A1 | 2/2021 | Rushton | H04L 41/0893 |
| 2021/0385292 | A1* | 12/2021 | Lowe | H04L 67/289 |
| 2022/0061059 | A1* | 2/2022 | Dunsmore | H04W 72/085 |

* cited by examiner

*Primary Examiner* — Hua Fan

(57) ABSTRACT

A multi-region cloud service facilitated by a distributed container execution system comprising a plurality of edge proxy servers deployed in a plurality of geographical regions to receive from a plurality of client devices a plurality of requests to access the distributed container execution system and a plurality of application servers deployed in the plurality of geographical regions to provide the cloud service. Each edge proxy server is configured to analyze each request it receives to identify a target geographical region of the respective request, transmit the respective request to the application server(s) deployed in a same geographical region in case the target geographical region is the geographical region of the edge proxy server, and transmit the respective request to other edge proxy server(s) deployed in the target geographical region in case the target geographical region is not the geographical region of the respective edge proxy server.

17 Claims, 12 Drawing Sheets

MULTI-REGION CLOUD ARCHITECTURE

RELATED APPLICATIONS

This application claims the benefit of priority under 35 USC § 119(e) of U.S. Provisional Patent Application No. 63/251,769 filed on Oct. 4, 2021, the contents of which are incorporated by reference as if fully set forth herein in their entirety.

BACKGROUND

The present invention, in some embodiments thereof, relates to a multi-regional cloud service, and, more specifically, but not exclusively, to a multi-regional cloud service distributed in a plurality of geographical regions and configured to maintain data privacy by preventing exportation of private data of each region outside of the respective region.

Distribution, deployment and usage of cloud services and web based applications is constantly increasing as cloud services have become a cornerstone for a plurality of applications spanning across almost all aspects of modem life, from finance and commercial markets, through data technology and design (e.g. software design) activities to gaming and leisure applications.

The cloud services opened the way for further provide global services distributed across multiple geographical regions such that users may access the cloud services to gain access to their data, applications, development environment, design frameworks and much more from practically any place in the world providing network access.

However, deploying multi-region cloud services in a plurality of regions may present major challenges in a plurality of domains, for example, (version) consistency, scalability, performance, latency, resilience, data security, and data privacy to name just a few.

SUMMARY

According to a first aspect of the present invention there is provided a multi-region cloud service, comprising a distributed container execution system comprising a plurality of edge proxy servers deployed in a plurality of geographical regions to receive, via one or more networks, a plurality of requests to access the distributed container execution system from a plurality of client devices, and a plurality of application servers deployed in the plurality of geographical regions to provide the cloud service, each of the plurality of application servers is communicatively coupled to one or more edge proxy servers deployed in the same geographical region. Wherein each of the plurality of edge proxy servers is configured to:

Analyze each request received at the respective edge proxy server to identify a target geographical region of the respective request.

Transmit the respective request to one or more of the plurality of application servers deployed in a same geographical region as the respective edge proxy server in case the target geographical region is the geographical region of the respective edge proxy server.

Transmit the respective request to one or more other edge proxy servers deployed in the target geographical region in case the target geographical region is not the geographical region of the respective edge proxy server.

According to a first aspect of the present invention there is provided a method of managing requests to a multi-region cloud service, comprising using at least one edge proxy server of a distributed container execution system of a multi-region cloud service comprising a plurality of edge proxy servers deployed in a plurality of geographical regions to receive, via one or more networks, a plurality of requests to access the distributed container execution system from a plurality of client devices, and a plurality of application servers deployed in the plurality of geographical regions each communicatively coupled to one or more of the plurality of edge proxy servers deployed in the same geographical region. The at least one edge proxy server deployed at a certain one of the plurality of geographical region is configured for:

Receiving, via one or more networks, one or more requests to access the distributed container execution system.

Analyzing the at least request to determine a target geographical region of the one or more requests.

Transmitting the one or more requests to one or more application servers of the multi-region cloud service deployed in the certain region in case the target geographical region is the certain geographical region.

Transmitting the one or more requests to one or more other edge proxy servers deployed the target geographical region in case the target geographical region is not the certain geographical region, the one or more other edge proxy servers are configured to transmit the one or more requests to one or more application servers deployed in the target geographical region.

In a further implementation form of the first and/or second aspects, the respective edge proxy server comprises an ingress controller configured to manage access to the distributed container execution system.

In a further implementation form of the first and/or second aspects, the respective edge proxy server is communicatively coupled to one or more of the plurality of application servers deployed in the same geographical region via one or more Virtual Private Cloud (VPC) networks facilitated by the distributed container execution system.

In a further implementation form of the first and/or second aspects, the respective edge proxy server is communicatively coupled to the one or more other edge proxy servers deployed in a different geographical region via one or more peering connection facilitated by the distributed container execution system.

In a further implementation form of the first and/or second aspects, the distributed container execution system is deployed using one or more cloud computing platforms.

In a further implementation form of the first and/or second aspects, the application servers in each of the plurality of geographical regions are configured to access regional storage resources deployed in the respective geographical region for storing region specific data relating to the respective geographical region and are inaccessible from other geographical regions.

In a further implementation form of the first and/or second aspects, each application server deployed in each of the plurality of geographical regions is configured to execute one or more applications of a group consisting of: one or more regional applications, one or more distributed applications, and one or more global applications. The one or more regional applications fully deployed in one or more application servers of the respective geographical region and not sharing data with other geographical regions. The one or more distributed applications fully deployed in one or more application servers of the respective geographical region and sharing non-private data with one or more other geographical regions. The one or more global applications deployed in a single geographical region of the plurality of geographical regions and accessible from other geographical regions.

In a further implementation form of the first and/or second aspects, the one or more applications are deployed in the distributed container execution system according to one or more deployment protocols which are members of a group comprising: manual per-region deployment, manual all at once deployment, gated Canary deployment, and full Canary deployment.

In a further implementation form of the first and/or second aspects, the one or more application servers deployed in each of the plurality of geographical regions is configured to use one or more secrets of a group comprising: one or more global secrets, and one or more regional secrets, the global secrets are used by application servers deployed in at least some of the plurality of geographical regions, the regional secrets are used exclusively by one or more application servers deployed in the receptive geographical region.

In a further implementation form of the first and/or second aspects, the one or more global secrets are stored in a global secret store deployed in a primary geographical region of the plurality of geographical regions and replicated to a regional secret store deployed in each of the at least some geographical regions. The one or more regional secrets are stored in the global secret store and replicated exclusively to the regional secret store of the respective geographical region.

In a further implementation form of the first and/or second aspects, the global secret store is accessible for updating the one or more global secrets and/or the one or more regional secrets.

In an optional implementation form of the first and/or second aspects, disaster recovery measures are applied separately in each of the plurality of geographical regions, the disaster recovery measures are configured to enable data recovery without exposing private data to resources outside the respective geographical region.

In a further implementation form of the first and/or second aspects, the respective edge proxy server is configured to transmit general status data excluding private data relating to at least some of the requests received at the respective edge proxy server to one or more global monitoring services deployed in one or more of the plurality of geographical regions and accessible from at least some of the plurality of geographical regions.

In a further implementation form of the first and/or second aspects, the respective edge proxy server is configured to transmit restricted status data comprising private data relating to at least some of the requests received at the respective edge proxy server to one or more regional monitoring services deployed in the geographical region of the respective edge proxy server and inaccessible from all other geographical regions.

In a further implementation form of the first and/or second aspects, each of the plurality of edge proxy servers is configured to determine a destination for transmitting the respective request based on one or more routing rules.

In a further implementation form of the first and/or second aspects, the respective edge proxy server is configured to determine the target geographical region of the respective request based on geographical routing information extracted from the respective request, the geographical routing information is derived from account information of a user using one or more of the plurality of client devices from which the respective request originates.

In a further implementation form of the first and/or second aspects, the geographical routing information is extracted from one or more cookies previously installed in the one or more client devices.

In a further implementation form of the first and/or second aspects, the one or more cookies are installed in the one or more client devices during authentication of a login request transmitted by the one or more client devices to the distributed container execution system.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
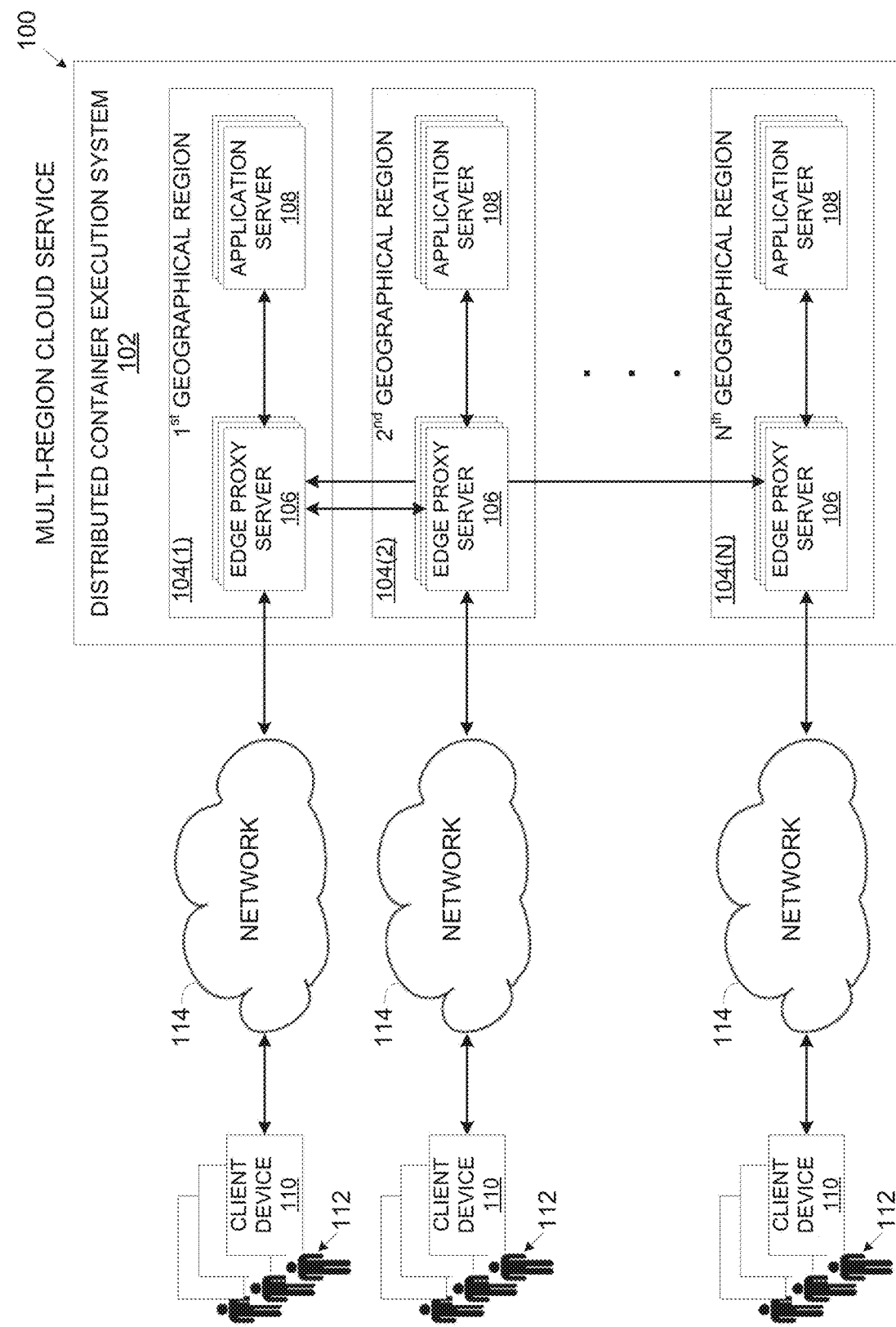
FIG. 1 is a schematic illustration of an exemplary multi-region cloud service in which at least some user data of each user is restricted to the geographical region in which the respective user is registered, according to some embodiments of the present invention.

The present invention, in some embodiments thereof, relates to a multi-regional cloud service, and, more specifically, but not exclusively, to a multi-regional cloud service distributed in a plurality of geographical regions and configured to maintain data privacy within each geographical region by preventing exportation of private data of each region outside of the respective region.

According to some embodiments of the present invention, there are provided methods, systems, and computer program products for deploying a multi-region cloud service offering one or more applications, services, and/or the like globally accessible from a plurality of geographical regions. The geographical regions, for example, north America, south America, western Europe, eastern Europe, north Africa, middle east, southeast Asia, Australia and/or the like may be divided according to one or more division paradigms, for example, geography, law and/or regulation enforcement, politics, economics, finance, culture and/or the like. The multi-region cloud service may typically include a primary geographical region and one or more secondary geographical regions.

In particular, the multi-region cloud service may be configured to provide global access while maintaining and ensuring privacy of private data associated with each region such that the private data relating to each geographical region is not shared, distributed, exchanged, transmitted, replicated, exposed and/or otherwise exported out of the respective geographical region.

The multi-region cloud service may be typically utilized using virtualization technology, for example, Virtual Machines (VM) and moreover a virtualized container environment in which services, applications, processes and/or workloads may be each executed using a standalone container (or Docker in Linux environment) which may be easily deployed and/or instantiated cross-platform, cross Operating System (OS) in the virtual environment practically independently of the hosting environment.

For efficient deployment, execution, scalability and performance, the multi-region cloud service may be therefore facilitated by a container execution system, for example, Kubernetes and/or the like configured to provide an orchestration environment and platform for managing containerized workloads, services and applications. In particular, the multi-region cloud service may be facilitated by a distributed container execution system deployed across the plurality of geographical regions supported by the multi-region cloud service such that the execution environment in each of the geographical regions is independent of the execution environment of each of the other geographical regions.

The distributed container execution system may comprise a plurality of edge proxy servers (frontend servers) deployed at the edge of the multi-region cloud service in the plurality of geographical regions which may be configured to provide and manage access to the multi-region cloud service, specifically to one or more application servers including, for example, ingress control, Domain Name Service (DNS), load balancing, reverse proxy and/or the like.

The application servers (backend servers) deployed in at least some of the geographical regions may be configured to execute one or more of the applications, services, datacenters, tools and/or utilities (collectively designated applications herein after) offered by the multi-region cloud service.

Optionally, the applications executed by the application servers and/or by the edge proxy servers may be implemented using microservices architecture to expedite development, testing and deployment, increase scalability, improve interoperability and migration, reduce maintenance, increase performance, reduce latency and more.

Optionally, the multi-region cloud service, specifically the distributed container execution system may be deployed and/or utilized using one or more cloud services, platforms and/or infrastructures, such as, for example, Amazon Web Service (AWS), Google Cloud, IBM Cloud, Microsoft Azure and/or the like. For example, one or more Virtual Private Clouds (VPC) may be deployed in each of the geographical regions such that the VPC(s) deployed in each geographical region is independent of the VPCs deployed in all other geographical regions.

Intra-region communication within each region between the edge proxy servers and the applications servers deployed in the same region as well as inter-region communication between edge proxy servers deployed in different regions may be therefore done using one or more means, networks and/or channels facilitated by the distributed container execution system, for example, routing tables, VPC networks, peering connections, Virtual Private Network (VPN) connections, tunnels and/or the like.

The plurality of users of the multi-region cloud service which may include, individuals, commercial companies, organizations, authorities and/or the like may be each typically associated with one of the plurality of geographical regions of the cloud service. For example, live, work, locate, open an account, and/or the like in the respective geographical region.

Private data may be accumulated in each of the geographical regions for the users associated with the respective geographical region, for example, loaded, stored and/or originate from the users and/or captured by the multi-region cloud service for the users. The private data may include practically any data designated as private, sensitive secure and/or the like, for example, data relating to users of the multi-region cloud service, for example, personal information, financial information, medical information, business sensitive information (e.g. trade secrets, strategy policies, customer database, etc.), design and development information, Intellectual Properties (IP) and/or the like.

However, while their private data may be located in one geographical regions, one or more of the users may be travelling and may therefore access the multi-region cloud service from one or more other geographical regions.

The multi-region cloud service may be therefore configured to support global access of users from any of the plurality of geographical regions to their private data exclusively and securely stored in their associated geographical regions. In particular, the multi-region cloud service 100 may be configured and deployed to ensure privacy, security and/or safety of private data relating to each of the geographical regions according to the geographical segregation between the geographical regions.

For example, each of the edge proxy servers may be configured to analyze each request it receives from one or more of the client devices used by the users to access the multi-region cloud service in order to identify and determine the target geographical region of each received request. In case the edge proxy server determines that the request targets the same geographical region in which the edge proxy server is deployed, the edge proxy server may transmit (forward) the request to one or more of the application servers deployed in the same geographical region. However, in case the edge proxy server determines that the request targets another geographical region, the edge proxy server may transmit (forward) the request to edge proxy servers deployed in the other geographical region which may in turn transmit the request to one or more of the application servers deployed in the other geographical region.

The edge proxy server may determine the target geographical region of each request according to geographical routing information extracted from the respective request.

In another example, regional storage resources, for example, a database, a bucket, a datacenter, and/or the like may be deployed in each of one or more of the geographical regions for storing region specific private data relating to the respective geographical region such that the regional storage resources of each geographical region may be inaccessible from any of the other geographical regions.

Moreover, while the servers deployed in the plurality of geographical regions may use global data items, secrets and parameters (collectively designated secrets), one or more of the servers deployed in one or more of the geographical regions may use regional secrets created for exclusive use in the respective geographical region which may be thus stored in a regional secret store created in the regional storage resources of the respective geographical region. In order to support scalability and simplicity of controlling these regional data items, secrets and parameters (collectively designated regional secrets), all secrets both global secrets and regional secrets may be created and stored in a single secret store deployed in a single geographical region, for example, the primary geographical region. The secrets may be then selectively replicated in the regional secret stores.

In another example, the application servers deployed in the plurality of regions may execute applications that may access, process and/or generate private data. In order to prevent exposing this private data to resources deployed other geographical regions, each of the applications executed by the servers of the multi-region cloud service may be classified as a regional application, a distributed application or a global application.

A regional application may be fully deployed and executed by the application server(s) deployed in a respective geographical region and may be configured not to share, exchange and/or replicate data with any of the other geographical regions. A distributed application may be fully deployed and executed by the application server(s) deployed in a respective geographical region and to share, exchange and/or replicate only non-private data. A global application may be deployed and executed by the application server(s) deployed in a single geographical region, for example, the primary geographical region and may be accessible from each of the other geographical regions.

Moreover, several deployment schemes may be applied for deploying the applications in the plurality of geographical regions in order to overcome challenges resulting from the geographical segregation between the geographical regions, for example, consistency between applications in different regions, scalability, control over the release, automation, performance evaluation and more. These deployment schemes which may include, for example, manual per-region deployment, manual all at once deployment, gated Canary deployment, and full Canary deployment may be selected according to one or more attributes of the deployed application, for example, type, criticality, privacy, scale and/or the like.

In another example, in order to ensure privacy of the private data stored in each of the geographical regions, disaster recovery measures and/or protocols may be applied separately in each of the plurality of geographical regions isolated from all other geographical regions. As such, backup, replication, restoration and/or other such data recovery operations may be done per geographical region using the regional storage resources of the respective geographical region without exposing the private data with resources outside the respective geographical region.

In another example, the edge proxy servers of each geographical region may be configured to transmit general status data to one or more global monitoring services, applications and/or servers deployed in one or more of the plurality of geographical regions for example, in the primary geographical region. The global monitoring services which may be accessible from at least some of the plurality of geographical regions may thus collect the general status data which may exclude any private data.

Moreover, one or more of the edge proxy servers may be configured to transmit restricted status data to one or more regional monitoring services deployed in the geographical region in which the respective edge proxy servers is deployed. The regional monitoring service(s) deployed in each geographical region may be inaccessible from all other geographical regions and may thus collect restricted status data which may include private data relating to the respective geographical region.

The data privacy oriented multi-region cloud service architecture described herein may present major benefits and advantages compared to existing cloud services including existing multi-region cloud services.

First, configuring the data privacy oriented multi-region cloud service to support global access to geographically restricted private data may enable users of the multi-region cloud service to securely access their private data from practically anywhere without moving the private data out of their associated geographical region. The multi-region cloud service may be therefore fully compliant with regulatory directives applicable in one or more counties and/or regions, for example, Europe which limit the distribution of private data outside Europe. This may be in contrast to existing cloud services, in particular, multi-region cloud services which may be unable to ensure data privacy within each geographical region.

Moreover, constructing the privacy oriented multi-region cloud service using the virtualized containers and further facilitating is using the distributed container execution system, for example, Kubernetes and/or the like and its inherent capabilities (e.g. networking capabilities) may significantly improve scalability, stability and robustness of the data privacy oriented multi-region cloud service. Performance may be also increased due to the containerized execution, for example, reduced execution time (latency), reduced resource utilization (e.g. computing resources, storage resources, network resources, etc.) and/or the like.

Furthermore, robustness and failure immunity of the multi-region cloud service may be significantly increased since the servers, i.e., the edge proxy server(s) and application server(s) deployed in each geographical region are separate and independent of the servers deployed in the other geographical regions. Therefore, even in case of failures such as, for example, down server(s), networking failure, cyber-attack and/or the like in one or more of the geographical regions, possibly including the primary geographical region, the servers in other geographical regions may be unaffected and may continue to operate normally.

In addition, deploying regional storage resources which are restricted for use with in the geographical region and are externally inaccessible may further ensure security, safety and/or privacy of the private data. Moreover, the exclusive use of region specific secrets and parameters by resources in the respective geographical region may ensure these values are not exported and/or exposed outside the respective geographical region and may thus further increase security, safety and/or privacy of the private data.

Also, deploying both global and regional monitoring and logging services may enable collecting status data, metrics and/or the like to provide a comprehensive view of the operation of the data privacy oriented multi-region cloud service without compromising the private data relating to each of the geographical regions. Analyzing global information collected by the global monitoring and logging services, for example, global status data, global metrics and/or the like, specifically complemented by analysis of regional information, for example, region-specific status data, region-specific metrics and/or the like may identify patterns, trends, bottlenecks, failures, vulnerabilities and/or the like in the operation of the privacy oriented multi-region cloud service while analyzing regional status data, metrics and/or the like collected by the regional monitoring and logging services may further complement the global data to get a more accurate view of the operation of the data privacy oriented multi-region cloud service.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a schematic illustration of an exemplary multi-region cloud service in which at least some user data of each user is restricted to the geographical region in which the respective user is registered, according to some embodiments of the present invention.

An exemplary multi-region cloud service 100 configured to provide one or more cloud based services, for example, Infrastructure as a Service (IaaS), Platform as a Service (PaaS), Software as a Service (SaaS), Function as a Service (FaaS) and/or the like may be deployed to provide region based services in a plurality of geographical regions 104 divided according to one or more division paradigms, for example, geography, law and/or regulation enforcement, politics, economics, finance, culture and/or the like, for example, a $1^{st}$ geographical region 104(1), a $2^{nd}$ geographical region 104(2) and so on to a $N^{th}$ geographical region 104(N).

The plurality of geographical regions 104, for example, north America, south America, western Europe, eastern Europe, north Africa, middle east, southeast Asia, Australia and/or the like may optionally comprise a primary geographical region, for example, the $1^{st}$ geographical region 104(1) (e.g. USA or north America) and one or more secondary regions, for example, the $2^{nd}$ geographical region 104(2) to the $N^{th}$ geographical region 104(N).

A plurality of edge proxy servers 106 deployed at the edge of the multi-region cloud service 100 in the plurality of geographical regions 104 may be configured to provide and manage access to the multi-region cloud service 100, specifically to one or more of a plurality of application servers 108. Managing the access to the multi-region cloud service 100, may include, for example, ingress control, DNS, load balancing, reverse proxy and/or the like.

The plurality of application servers 108 deployed in the plurality of geographical regions 104 of the multi-region cloud service 100 may be configured to provide the actual application(s), services(s), tools and/or utilities (collectively designated applications herein after) offered by the multi-region cloud service 100.

The edge proxy servers 106 and the application servers 108 deployed in each of the geographical regions 104 may be completely independent of the edge proxy servers 106 and the application servers 108 deployed in any of the other geographical regions 104 such that failures, downtime and/or the like experienced in one geographical region 104 may not affect edge proxy servers 106 and/or application servers 108 deployed in other geographical regions 104.

A plurality of users 112 using a plurality of client devices 110, for example, a server, a computer, a laptop, a mobile device (e.g., Smartphone, tablet, etc.), a wearable device (e.g., smart watch, goggles, etc.) and/or the like may access the multi-region cloud service 100 specifically the edge proxy servers 106 via a network 114 comprising one or more wired and/or wireless networks, for example, a Local Area Network (LAN), a Wireless LAN (WLAN), a Wide Area Network (WAN), a Municipal Area Network (MAN), a cellular network, the internet and/or the like.

Since each edge proxy server 106 may be deployed at the edge of the cloud service 100 in one of the plurality of geographical region 104, the respective edge proxy server 106 connected to the network 114 of the respective geographical region 104 may typically receive access requests originating from client devices 110 located in the respective geographical region 104.

Optionally, no application servers 108 may be deployed in one or more of the geographical regions 104. In such case, the edge proxy servers 106 deployed in these geographical regions 104 may be configured to transmit (forward) requests received from client devices 110 located in these geographical regions 104 to one or more other edge proxy servers 106 deployed in one or more other geographical regions 104 such that the other edge proxy servers 106 may direct the requests to application servers 108 deployed in the other geographical regions 104.

Each of the edge proxy servers 106 may comprise one or more processors arranged for parallel processing, as clusters and/or as one or more multi core processor(s) and a non-transitory storage medium for code and/or data store and one or more network interfaces for connecting to the network 114 and/or for communicating with one or more of the application servers 108. The storage may comprise one or more non-transitory memory devices, either persistent non-volatile devices (e.g. Hard Drive (HDD), Solid State Disk (SSD), etc.) and/or volatile devices (e.g. RAM, cache, etc.). The storage may further include one or more network storage resources, for example, a storage server, a Network Accessible Storage (NAS), a network drive, a cloud storage and/or the like accessible via the network interface(s) of the respective edge proxy server 106.

Each edge proxy server 106 may be capable of executing one or more software modules such as, for example, a process, a script, an application, an agent, a utility, a tool, an Operating System (OS) and/or the like each comprising a plurality of program instructions executed by the processor(s) of the respective edge proxy server 106 from its storage (program store). One or more of the edge proxy servers 106 may optionally further include, utilize and/or otherwise facilitate one or more hardware modules (elements) available in the respective edge proxy server 106, for example, a circuit, a component, an Integrated circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

Each edge proxy server 106 may therefore execute one or more functional modules utilized by one or more software modules, one or more of the hardware modules and/or a combination thereof, for example, an ingress controller, an edge stack and/or the like such as, for example, Envoy and/or the like for managing and directing access of one or more of the client devices 110 to the application(s) provided by one or more of the application servers 108, for example, ingress control, DNS, load balancing, reverse proxy and/or the like.

Similarly, each of the application servers 108 may comprise one or more processors arranged for parallel processing, as clusters and/or as one or more multi core processor(s) and a non-transitory storage medium for code and/or data store and one or more network interfaces for communicating with one or more of the edge proxy servers 106 and/or with one or more other application servers 108. The storage may comprise one or more non-transitory memory devices, either persistent non-volatile devices and/or volatile devices. The storage may further include one or more network storage resources, for example, a storage server, a NAS, a network drive, a cloud storage and/or the like accessible via the network interface(s) of the respective application server 108.

Each application server 108 may be capable of executing one or more software modules such as, for example, a process, a script, an application, an agent, a utility, a tool, an OS and/or the like each comprising a plurality of program instructions executed by the processor(s) of the application server 108 from its storage (program store). One or more of the application servers 108 may optionally further include, utilize and/or otherwise facilitate one or more hardware modules (elements) available in the respective edge proxy server 106, for example, a circuit, a component, an IC, an ASIC, a FPGA, a DSP, a GPU, an AI accelerator and/or the like.

Each application server 108 may therefore execute one or more functional modules utilized by one or more software modules, one or more of the hardware modules and/or a combination thereof, for example, for executing one or more of the application(s), service(s) and/or datacenter(s) provided by the multi-region cloud service 100.

While the edge proxy servers 106 and the application servers 108 may be executed by physical machines and hardware processors, the edge proxy servers 106 and/or the application servers 108 may be typically implemented using virtualization technology, for example, virtual Machines (VM) instantiated over physical hardware.

Moreover, the edge proxy servers 106 and the application servers 108 may be deployed and executed as containers (e.g. Dockers, etc.) in a distributed container execution system 102 deployed to facilitate the multi-region cloud service 100 and thus distributed across the plurality of geographical regions 104. The distributed container execution system 102, for example, Kubernetes and/or the like may be configured to provide an orchestration environment and platform for managing containerized workloads, services and applications, for example, the ingress controller, edge stack module and/or the like executed by the edge proxy servers 106 and the applications executed by the application servers 108. In particular, an independent execution environment may be established in the distributed container execution system 102 in each of the geographical regions 102 which is independent of the execution environment of each of the other geographical regions 104.

The multi-region cloud service 100 may be deployed using a plurality of Virtual Private Clouds (VPC) facilitated and/or provided by one or more cloud infrastructures and/or services, such as, for example, AWS, Google Cloud, IBM Cloud, Microsoft Azure and/or the like. For example, one or more VPCs may be deployed in each of the geographical regions 104 such that the VPC(s) deployed in each geographical region 104 is isolated and independent of the VPCs deployed in all other geographical regions 104.

The edge proxy servers 106 may be each communicatively coupled to one or more application servers 108 deployed in the same geographical region 104 via one or more intra-region networking infrastructures such that the proxy server(s) 106 and the application server(s) 108 deployed in the same geographical region 104 may communicate with each other. While they may comprise one or more physical networks, the intra-region networking infrastructure(s) may be based on one or more VPC networks facilitated by the distributed container execution system 102. Communication between edge proxy servers 106 and application servers 108 deployed in the same geographical region 104 may be also based on routing tables defined for the respective geographical region 104, for example, for the VPC(s) deployed in the respective geographical region 104.

Moreover, each of the edge proxy servers 106 may be communicatively coupled to one or more other edge proxy servers 106 deployed in one or more other (different) geographical regions 104 via one or more inter-region networking infrastructures such that each proxy server 106 may communicate with edge proxy server(s) 106 deployed in one or more of the other geographical regions 104. While they may comprise one or more physical networks, the inter-region networking infrastructure(s) may be based on one or more peering connections, tunnels, Virtual Private Network (VPN) connections and/or the like facilitated by the distributed container execution system 102. For example, in case the distributed container execution system 102 is deployed using AWS, one or more AWS transit gateways may be used to connect between edge proxy server(s) 106 deployed in different geographical regions 104.

The multi-region cloud service 100 may be configured to ensure privacy, security and/or safety of private data relating to each of the geographical regions 104, for example, data relating to users such as the users 112 having accounts registered and maintained in each geographical region 104 such as, for example personal information, medical information, sensitive information, corporate information and/or the like.

To this end, the multi-region cloud service 100 optionally facilitated by the distributed container execution system 102 may be configured to restrict private data based on the geographical segregation between the geographical regions 104. As such, while global data excluding private data may be shared between different geographical regions, private data relating to each geographical region 104 may not be shared, distributed, exchanged, transmitted, replicated, exposed and/or otherwise exported from the respective geographical region 104.

One or more edge proxy servers 106 (frontend servers) and one or more application servers (backend servers) 108 may be therefore deployed in each of the geographical regions 104 to execute independently of the edge proxy servers 106 and application servers 108 deployed in the other geographical regions 104.

The edge proxy server(s) 106 and application server(s) 108 deployed in each geographical region 104 may be further configured to restrict and potentially completely prevent sharing data defined as private data and/or restricted data with edge proxy servers 106 and application servers 108 deployed in other geographical regions 104.

The private data may typically relate to one or more of the users 112, individuals, commercial companies, organizations, authorities and/or the like, and may include, for example, personal information, financial information, medical information, business sensitive information (e.g. trade secrets, strategy policies, customer database, etc.), design and development information, Intellectual Properties (IP) and/or the like.

The application server(s) 108 deployed in each of the plurality of geographical regions 104 may be therefore configured to access regional storage resources deployed in the respective geographical region 104 for storing region specific data relating to the respective geographical region. The regional storage resources of each geographical region 104 may be inaccessible from any of the other geographical regions 104.

Moreover, application servers 108 deployed in the plurality of geographical regions 104, optionally in the distributed container execution system 10, may use secrets and parameters which may comprise global secrets and parameters and/or region specific secrets and parameters.

Figure 2:
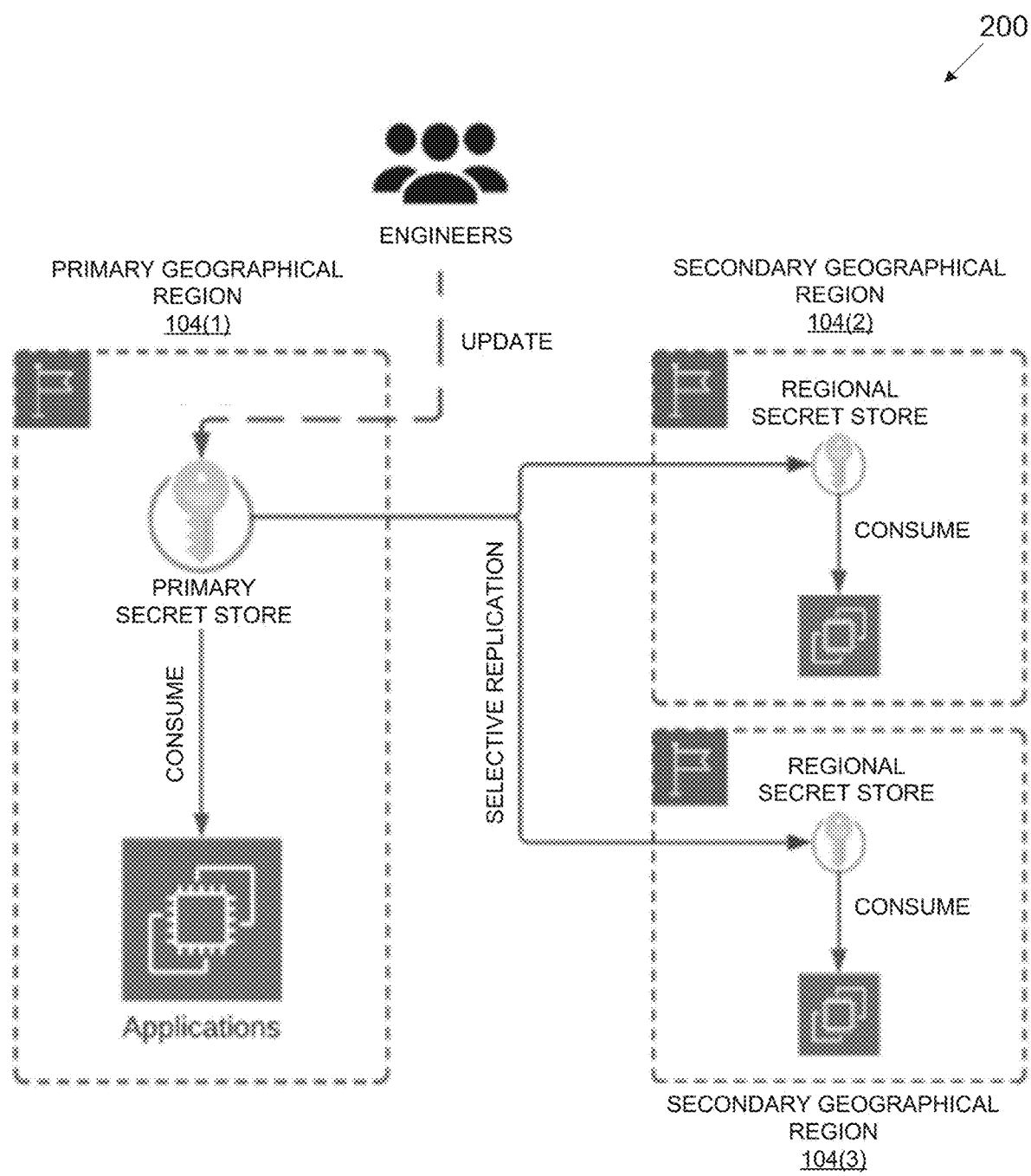
FIG. 2 is a schematic illustration of exemplary secret distribution in a multi-region cloud service, according to some embodiments of the present invention.

Reference is now made to FIG. 2, which is a schematic illustration of exemplary secret distribution in a multi-region cloud service, according to some embodiments of the present invention.

An exemplary secret distribution flow 200 may be executed for distributing secrets and/or parameters between geographical regions such as the geographical regions 104 of a multi-region cloud service such as the multi-region cloud service 100, specifically between application servers such as the application servers 108 deployed in a plurality of geographical regions 104, for example, a primary geographical region 104(1) and two secondary geographical regions 104(2) and 104(3).

As seen, a regional secret store may be created, stored and maintained in each of the geographical regions 104, for example, by one or more application servers 108 deployed in the respective geographical region 104. In particular, a primary secret store may be stored in the primary geographical region 104(1) and a respective regional key store may be stored in each of the secondary geographical region 104(2) and 104(3).

The primary secret store which is the only secret store that may be externally updated, for example, by one or more users, for example, engineers, Information Technology (IT) personnel and/or the like may produce and/or store all the secrets used in the plurality of geographical regions 104 including the primary geographical region 104(1) and the secondary geographical regions 104(2) and 104(3).

Each of the regional secret stores may store only the secrets used in the respective geographical region which may include one or more global secrets used across multiple and possibly all of the geographical regions 104 and/or one or more regional keys specific to the respective geographical region 104.

The primary secret store, specifically, the application server(s) 108 maintaining the primary secret store may therefore selectively replicate one or more of the secrets to one or more of the regional secret stores. For example, the primary secret store may replicate one or more global secrets in each of the regional secret stores. In another example, the primary secret store may replicate one or more regional secrets used in a certain geographical region 104. For example, the primary secret store may replicate in the regional secret store of the secondary geographical region 104(2) one or more regional secrets used in the secondary geographical region 104(2).

As such, the application servers 108 deployed in each geographical region 104 may be capable to execute and use the secret(s) locally stored in its primary and/or regional secret store regardless of the status (i.e., failure, downtime, maintenance, etc.) of the application servers 108 in the other geographical regions 104.

The secret store may be maintained by a secret engine executed in each geographical region 104 by the application server(s) 108 deployed in the respective geographical region 104. The secret engine may be configured according to one or more requirements, for example, ability to store a large number of secrets, keys and/or parameters, support high throughput concurrent access from a plurality of applications, support access control per application, support master key rotation, support auditing and generation of access logs, selective replication capability, backup capability and/or the like.

Furthermore, each application executed by one or more of the application servers 108 of the multi-region cloud service 100, optionally in the distributed container execution system 102, may be defined according to the regional segregation and isolation and may be thus configured as a regional application, a distributed application or a global application.

A regional application may be fully deployed and executed by one or more application servers 108 deployed in a respective geographical region 104. The regional application may be configured not to share, exchange and/or replicate data with any of the other geographical regions 104, specifically with any of the edge proxy servers 106 and/or the applications servers 108 deployed in the other geographical regions 104. Applications (services) which store, process and/or otherwise use private data, for example, data relating to users such as the users 112 may be therefore configured to be regional applications.

A distributed application may be fully deployed and executed by one or more application servers 108 deployed in a respective geographical region 104. The distributed application may be configured may be configured to share, exchange and/or replicate only non-private data, i.e., data not defined as private and/or restricted data with one or more other geographical regions 104, specifically with other edge proxy servers 106 and/or applications servers 108 deployed in the other geographical region(s) 104. Applications (services) requiring low latency and/or high resilience which do not store, process and/or otherwise use private data may be configured as distributed applications.

A global application may be deployed and executed by one or more application servers 108 deployed in a single geographical region 104, for example, the primary geographical region. The application server(s) 108 deployed in the single geographical region 104 may be accessible from each of the other geographical regions 104, i.e., from other edge proxy servers 106 and/or other applications servers 108 deployed in the other geographical region(s) 104 such that the other edge proxy servers 106 and/or the other applications servers 108 may access the global application. Non-critical applications (services) which are typically used only sparingly and do not store, process and/or otherwise use private data may be configured as global applications.

Several deployment schemes may be applied for deploying the applications in the plurality of geographical regions 104 in order to overcome challenges resulting from the geographical segregation between the geographical regions 104, for example, consistency between applications in different regions, scalability, control over the release, automation, performance evaluation and more.

Figure 3:
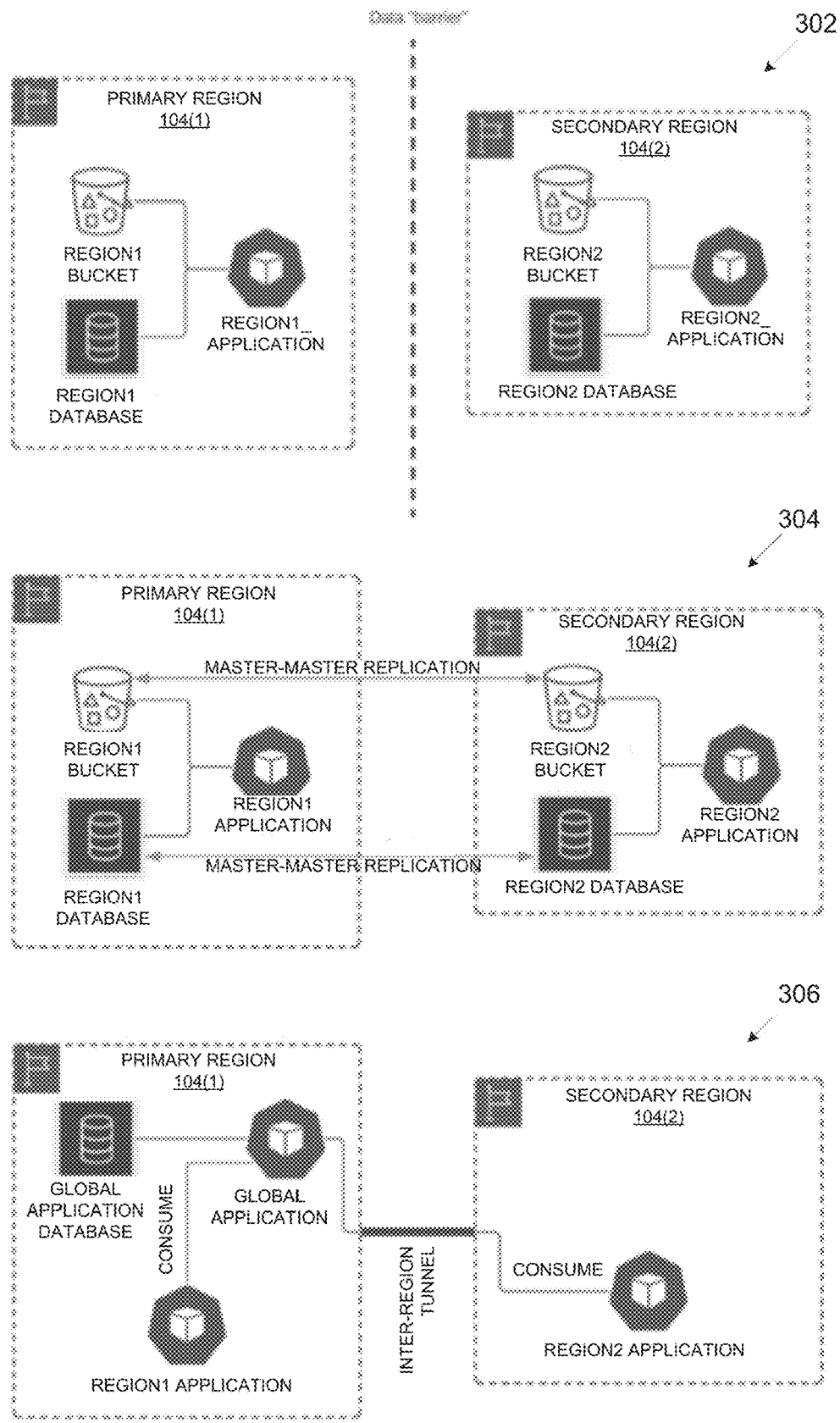
FIG. 3 is a schematic illustration of exemplary deployment of applications in a multi-region cloud service, according to some embodiments of the present invention.

Reference is now made to FIG. 3, which is a schematic illustration of exemplary deployment of applications in a multi-region cloud service, according to some embodiments of the present invention.

Schematic illustration 302 presents an exemplary deployment of a regional application fully deployed and executed by one or more application servers 108 deployed in a plurality of geographical regions 104 such as the geographical region 104 of a multi-region cloud service such as the multi-region cloud service 100, in particular in a primary geographical region 104(1) and a secondary geographical region 104(2).

As seen, a first instance of the application, namely region1_application, is executed in the primary geographical region 104(1) using a local region1_bucket and a local region1_database deployed in the primary geographical region 104(1) while a second instance of the application, namely region2_application, is executed in the secondary geographical region 104(2) using a local region2_bucket and a local region2_database deployed in the secondary geographical region 104(2).

As evident, a data barrier is applied between the primary geographical region 104(1) and the secondary geographical region 104(2) such that the region2_application and the region2_application do not share, exchange and/or replicate data with each other.

Schematic illustration 304 presents an exemplary deployment of a distributed application fully deployed and executed by one or more application servers 108 deployed in in the primary geographical region 104(1) and in the secondary geographical region 104(2). As described for the regional application, a first instance of the application, namely region1_application, is executed in the primary geographical region 104(1) using a local region1_bucket and a local region1_database deployed in the primary geographical region 104(1) while a second instance of the application, namely region2_application, is executed in the secondary geographical region 104(2) using a local region2_bucket and a local region2_database deployed in the secondary geographical region 104(2).

However, while each of the application instances, region1_application and region2_application may use their respective buckets and databases, data, specifically non-private data may be replicated between the buckets of the primary geographical region 104(1) and the bucket of the secondary geographical region 104(2), optionally in master-master replication mode. Similarly, data, specifically non-private data may be replicated between the database of the primary geographical region 104(1) and the database of the secondary geographical region 104(2), optionally in master-master replication mode.

Schematic illustration 306 presents an exemplary deployment of a global application may be deployed and executed by one or more application servers 108 deployed in one of the geographical regions 104, for example, the primary geographical region 104(1). The global application may further use a global application database deployed and stored in the primary geographical region 104(1). Two applications instances, namely region1_application executed in the primary geographical region 104(1) and region2_application executed in the secondary geographical region 104(2) may both communicate with the global application and consume, exchange, replicate, and/or share non-private data with the global application.

As seen, the region1_application residing in the primary geographical region 104(1) may communicate with the global application via one or more of the intra-region networks, while the region2_application residing in the secondary geographical region 104(2) may communicate with the global application via one or more of the inter-region networks, for example, an inter-region tunnel facilitated by a distributed container execution system such as the distributed container execution system 102, for example, Kubernetes.

The applications and services (collectively designated applications) executed by the edge proxy servers 106 and/or by the application servers 108, typically in the context of the distributed container execution system 102, whether regional applications, distributed applications and/or global applications may be constructed and deployed according to one or more design architectures, structures and/or methodologies.

For example, one or more of the applications may be structured and deployed accordingly as a monolith application comprising a single code unit configured to execute all functionality and features of the application. However, while monolith architecture may be applied, most if not all of the applications may be typically constructed as a collection of microservices each configured to execute a subset of the functionality and features of the application. Optionally, a combination of microservices based applications and monolith applications may be applied in the distributed container execution system 102 facilitating the multi-region cloud service 100.

Deployment of updated versions and/or revisions (including the initial deployment) of each application in the distributed container execution system 102 facilitating the multi-region cloud service 100 may be done according to one or more deployment protocols and/or methodologies optionally depending on the structure of the application, i.e., monolith or microservice.

Reference is now made to FIG. 4A, FIG. 4B, FIG. 4C, FIG. 4D, FIG. 4E and FIG. 4F, which are schematic illustration of exemplary deployment sequences of applications in a multi-region cloud service such as the multi-region cloud service 100, according to some embodiments of the present invention.

Figure 4A:
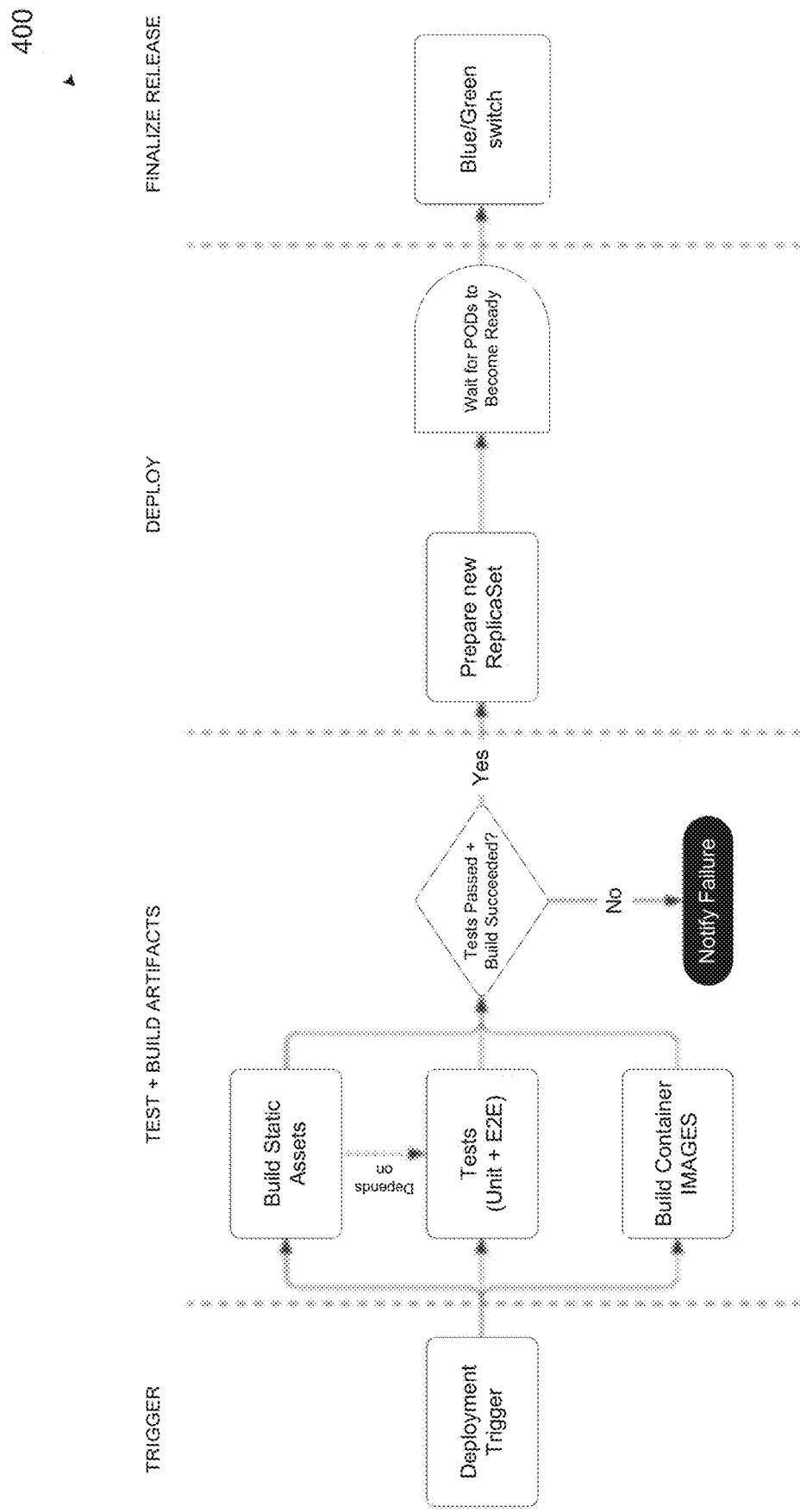
FIG. 4A, FIG. 4B, FIG. 4C, FIG. 4D, FIG. 4E and FIG. 4F are schematic illustration of exemplary deployment sequences of applications in a multi-region cloud service, according to some embodiments of the present invention.
Figure 4B:
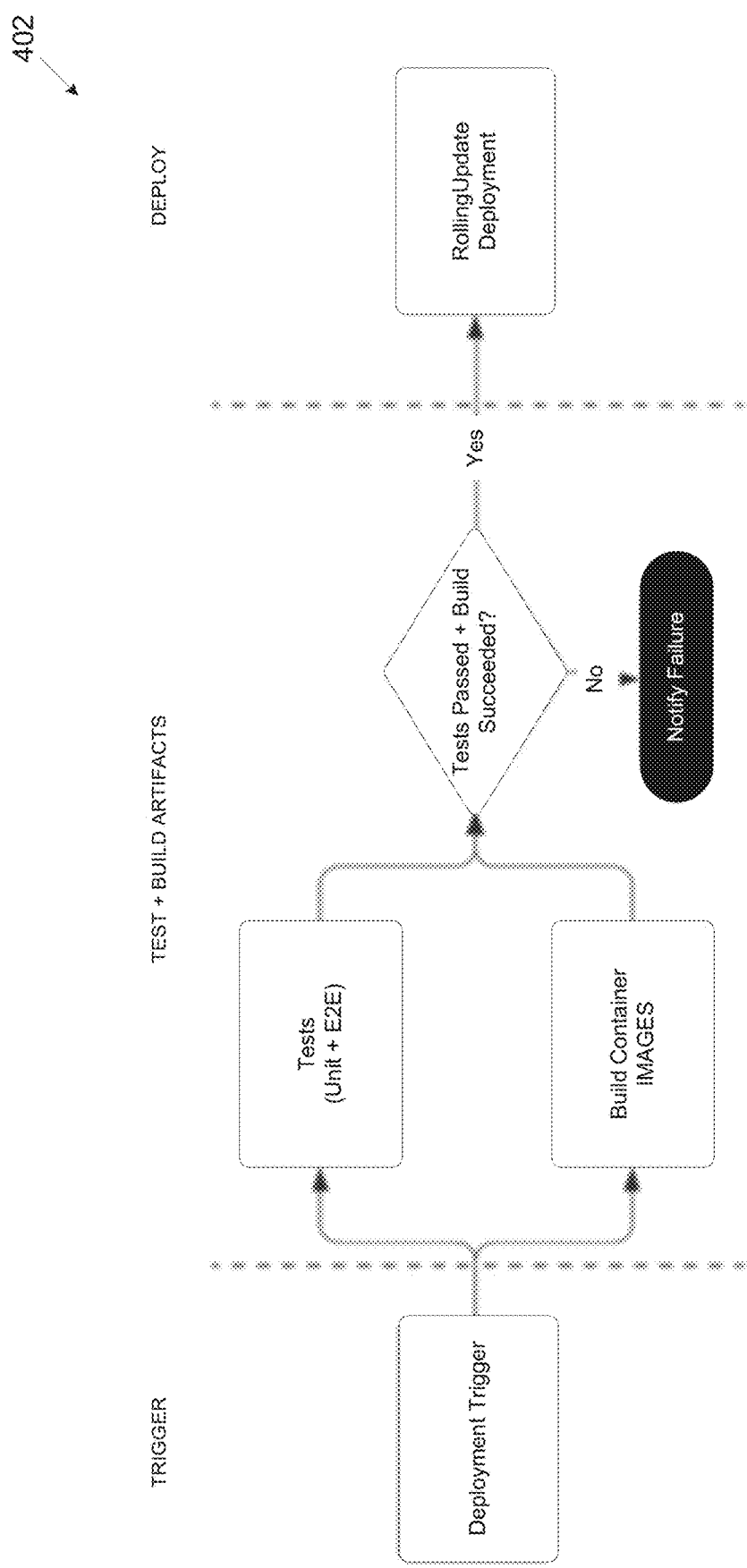

An exemplary deployment sequence 400 shown in FIG. 4A and an exemplary deployment sequence 402 shown in FIG. 4B are presented as reference for deploying monolith applications and microservices respectively to production in a single region cloud service, typically facilitated by a container execution system providing an orchestration and management platform for executing containerized applications and/or services of the cloud service, for example, Kubernetes.

As seen in the deployment flow 400 for a monolith application, after triggering a deployment cycle in the trigger phase, a test and built artifacts phase may be started in which the application may be built, for example, building static assets, building container (e.g. Docker) images and tested, for example, using unit test, End-to-End (E2E) tests and/or the like. In case the tests passed successfully and the application id successfully built, the deployment flow 400 may proceed to the deploy phase, otherwise a failure notification may be initiated. in the deploy phase, a new ReplicaSet may be prepared as known in the art and after all PODs of the monolith application become ready, a final release phase may be started in which Blue/Green switching may be applied to deploy the new application version in the production environment of the cloud service.

The process 402 describing the deployment of a microservice in the single region cloud service may be simpler due to the inherent modularity of a microservices based applications where deploying an updated version of one microservice in the production environment may not affect the other microservices. As seen, after the deployment trigger, the microservices container image(s) may be built and tested (e.g. unit tests and E2E tests) and in case of successful build and testing, the deployment flow 402 may proceed to the deploy phase in which RollingUpdate may be applied as known in the art to deploy the updated microservice while other microservices may be unaffected.

However, deployment of applications and services in the multi-region cloud service 100 facilitated by a distributed container execution system such as the distributed container execution system 102 may be more complex as it may present challenges not encountered in the single-region cloud service. These challenges may include, for example, automation vs. manual deployment, risk of bugs in a very large scale deployment, complex deployment in multiple independent regions, inconsistency of applications (versions) across regions, extended deployment time to name just a few.

Several deployment approaches, methodologies and/or techniques may be therefore applied to mitigate the risks entailed in the challenges described herein before for deploying applications, specifically microservices in the multi-region cloud service 100 facilitated by the distributed container execution system 102, for example, Kubernetes.

For brevity, the deployment processes are described herein for a multi-region cloud service 100 comprising three geographical regions such as the geographical regions 104. This however should not be construed as limiting, since the same deployment processes, flows, methodologies and/or techniques may be easily scaled to any number of geographical regions 104 of the multi-region cloud service 100 as may be apparent to a person skilled in the art.

Figure 4C:
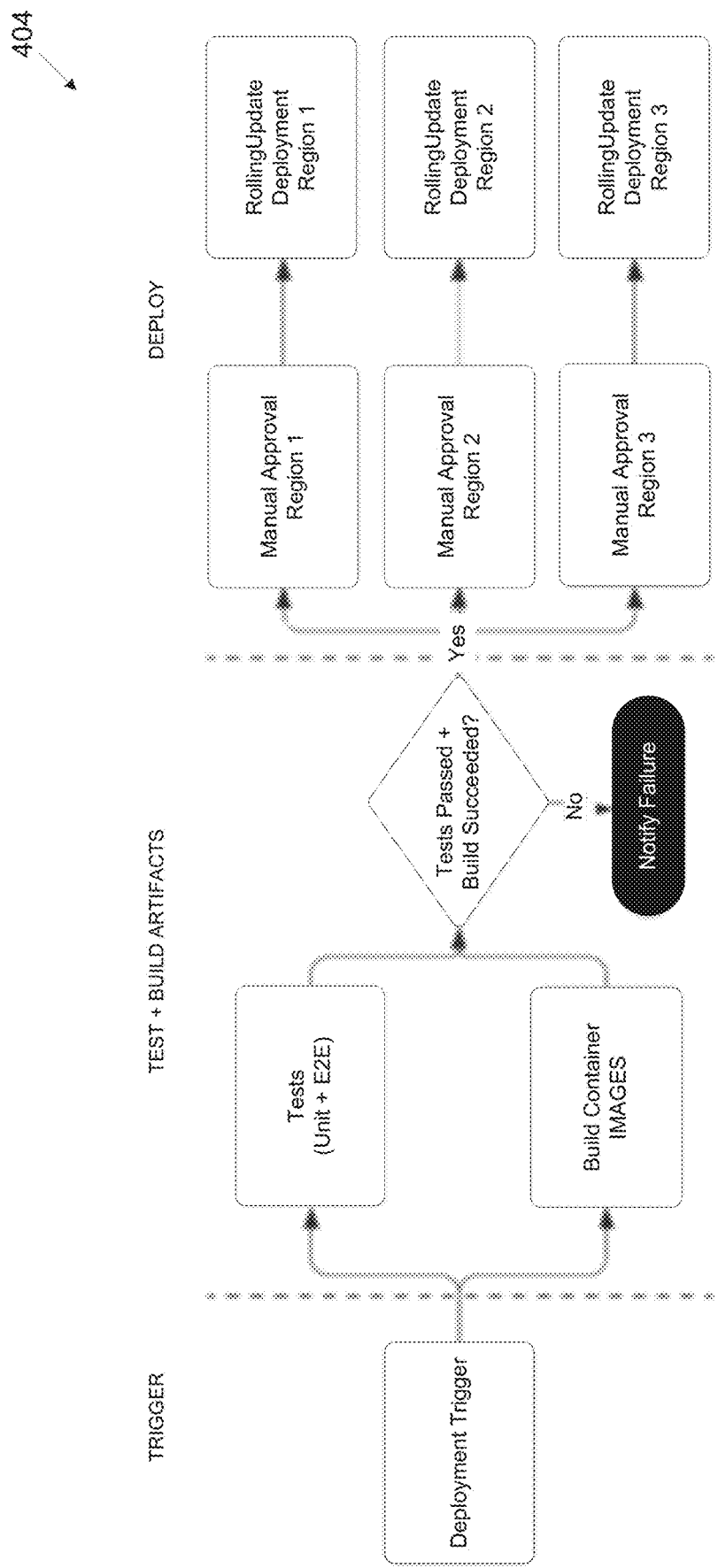

For example, as seen in a manual deployment per region flow 404 in FIG. 4C, a microservice may be manually deployment separately in each of the geographical regions 104 of the multi-region cloud service 100, for example, a $1^{st}$ geographical region 104 (Region 1), a $2^{nd}$ geographical region 104 (Region 2) and a $3^{rd}$ geographical region 104 (Region 3). As described for the reference deployment flows, after deployment trigger, the microservice may be built (container images) and tested (e.g. unit tests and E2E tests). In case of successful build and testing, the deployment flow 404 may proceed to the deploy phase, otherwise a failure notification may be initiated. In the deploy phase, a manual approval may be applied separately in each of the geographical regions 104 to approve deployment of the microservice in the respective geographical region 104.

The manual deployment per region may be significantly simple and may enable control of the deployment in each of the geographical regions 104. However, the manual deployment per region may lead to inconsistency of the microservice between different geographical regions 104 since the deployment is manual and separate in each geographical region 104 and may thus take place at different times and in extreme cases not at all due to failure to manually approve the deployment in one or more regions. The manual deployment per region process may also present some scalability issues as it may become cumbersome in case the multi-region cloud service 100 comprises a large number geographical regions 104. Moreover, no Key Performance Indicator (KPI) metrics are captured, measured and/or evaluated before deployment of the microservice in the plurality of geographical regions 104.

Figure 4D:
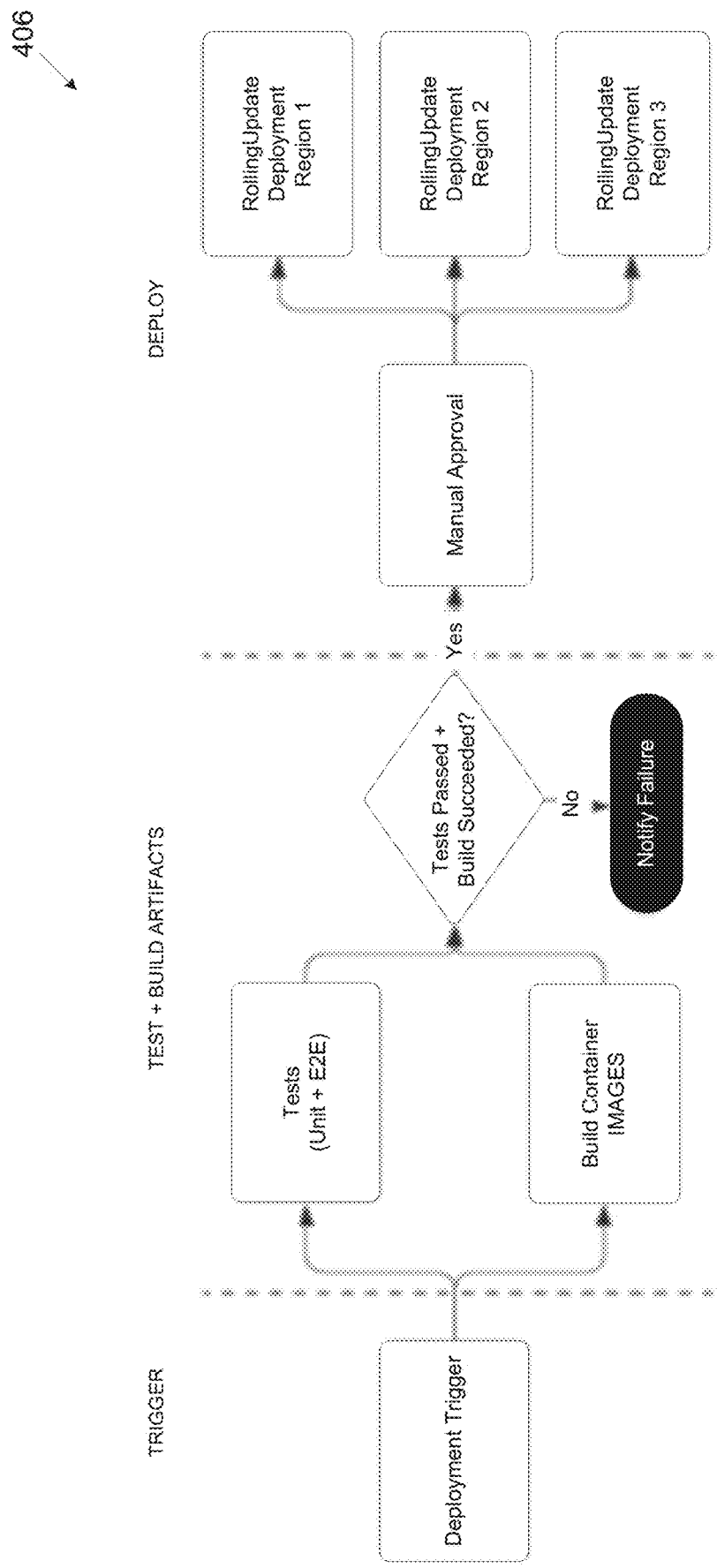

In another example, as seen in a manual all regions at once deployment flow 406 in FIG. 4D, a microservice may be manually deployment simultaneously at the same time in all the geographical regions 104 of the multi-region cloud service 100, for example, the $1^{st}$ geographical region 104 (Region 1), the $2^{nd}$ geographical region 104 (Region 2) and the $3^{rd}$ geographical region 104 (Region 3). After deployment trigger, the microservice may be built (container images) and tested (e.g. unit tests and E2E tests). In case of successful build and testing, the deployment flow 406 may proceed to the deploy phase, otherwise a failure notification may be initiated. In the deploy phase, a manual approval may be applied collectively for all the geographical regions 104 to approve deployment of the microservice simultaneously across all the geographical regions 104. In case the deployed microservice experiences one or more failure, performance degradation, side effects and/or the like, the microservice may be rolled back at once in all the geographical regions 104 of the multi-region cloud service 100 to restore a previous version (revision) of the microservice.

The manual all regions at once deployment may overcome some of the limitations presented before, for example, highly simple, significantly reduce deployment time, ensure consistency of the microservice across all regions, high scalability. However, the all regions at once deployment may be prone to some risks, for example, due to the reduced control over deployment in each region separately, a bug in the microservice may have a major affect over all of the regions rather than limited to a single or few regions. Moreover, the manual all regions at once deployment also does not rely on KPI metrics captured, measured and/or evaluated before deployment of the microservice in the plurality of geographical regions 104.

Figure 4E:
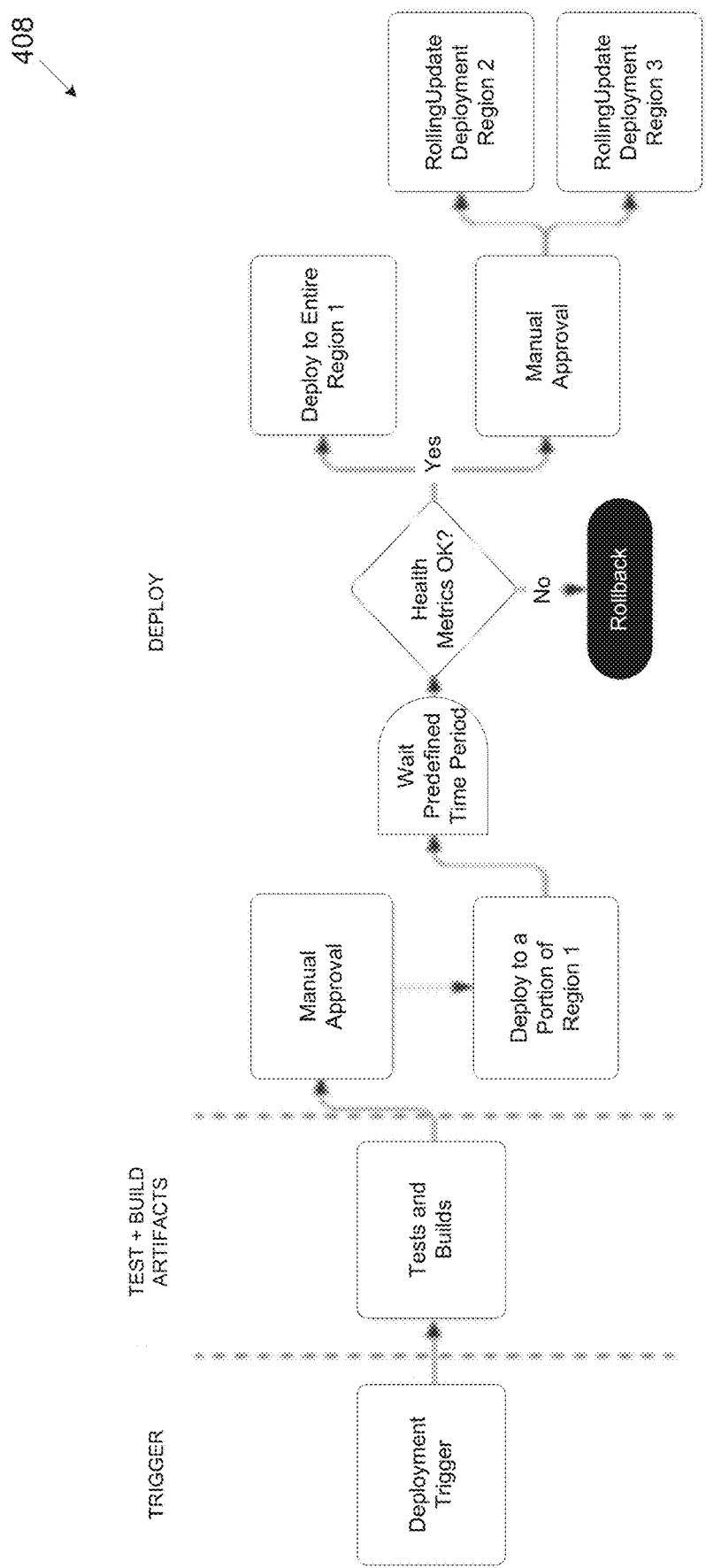

In another example, as seen in a gated Canary deployment flow 408 in FIG. 4E, the deployment of the microservice in the $1^{st}$ geographical region 104 (Region 1), the $2^{nd}$ geographical region 104 (Region 2) and the $3^{rd}$ geographical region 104 (Region 3) may be significantly automated and enhance by measuring one or more KPI metrics and reducing manual intervention involved in approving the deployment. Following the deployment trigger, the microservice may be built and tested as described herein before. In case of successful build and testing, the deployment flow 408 may proceed to the deploy phase, otherwise a failure notification may be initiated.

In the deploy phase, a manual approval may be first applied to approve initial deployment of the microservice in only a portion of the population of only a subset of the geographical regions 104 of the multi-region cloud service 100, for example, 3% of the population of the $1^{st}$ geographical region 104 (Region 1) which may optionally be the primary region. After the initial deployment, one or more key health KPI metrics may be captured and/or measured during a predefined time period, for example, 5 minutes, 15 minutes, 30 minutes and/or the like. The KPI metrics which may be indicative of performance and/or functionality of the limited deployment microservice may be may be automatically analyzed and evaluated by one or more evaluation applications, tools, and/or agents to determine whether the health KPI metrics are OK, i.e., whether the limited deployed microservice functions as expected presenting no failures, no side effects, performance degradation and/or the like.

In case, based on the analysis of the KPIs, it is determined that the limited deployment microservice does not perform and/or execute as expected, a Rollback may be applied to roll the microservice back to a previous version (revision). In case it is determined that the limited deployment microservice performs and executes as expected, the microservice may be further deployed to the rest of the population of the subset of geographical regions 104 in which it was initially deployed, for example, the entire population of the $1^{st}$ geographical region 104 (Region 1). The microservice may be also further deployed, optionally following a collective manual approval, in a RollingUpdate process in the other geographical regions 104, for example, the $2^{nd}$ geographical region 104 (Region 2) and the $3^{rd}$ geographical region 104 (Region 3).

Figure 4F:
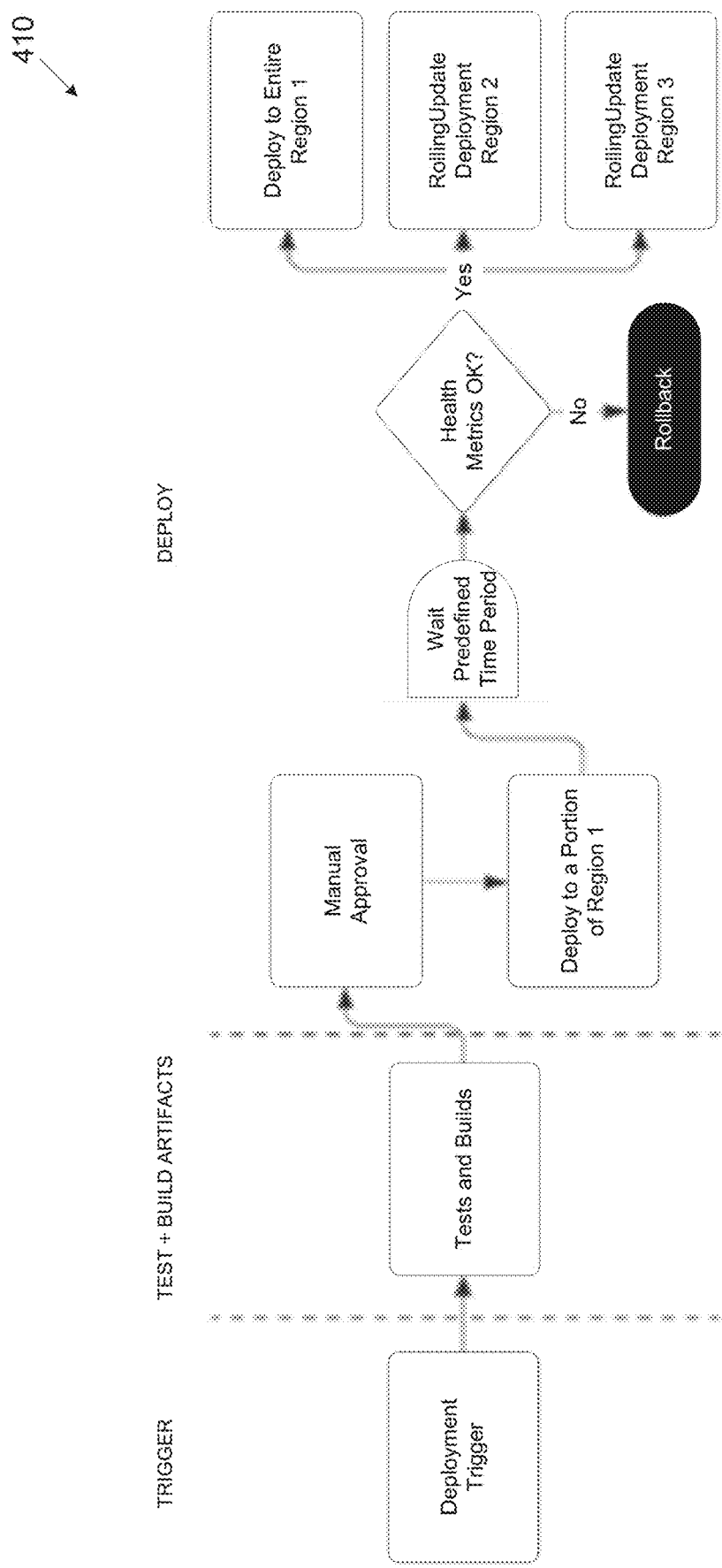

In another example, a full Canary deployment flow 410 shown in FIG. 4F which is a variant of the gated Canary deployment flow 408 may further automate and/or expedite the deployment of the microservice. The full Canary deployment flow 410 is similar to the gated Canary deployment flow 408 with the exception that after determining the limited deployment microservice performs and executes as expected, the microservice may be deployed to all of the geographical regions 104 of the multi-region cloud service 100 including the rest of the population of the subset of geographical regions 104 in which it was initially deployed, for example, the (rest of) $1^{st}$ geographical region 104 (Region 1), the $2^{nd}$ geographical region 104 (Region 2) and the $3^{rd}$ geographical region 104 (Region 3).

The gated and full Canary deployments may further enhance deployment of the microservice to further overcome the limitations presented before. For example, relying on the measured and evaluated KPI metrics may reduce the need for manual approval of the microservice deployment thus significantly simplifying the deployment and/or reducing deployment time. Moreover, since at least some key KPI metrics are first measured and evaluated for a limited deployment of the microservice, full deployment of the microservice may be done only after verifying the microservice successfully functions as expected. This may significantly increase safety, robustness and/or performance of the deployed microservice may be ensured.

According to some embodiments, in order to ensure data privacy of the data stored in each of the geographical regions, disaster recovery measures and/or protocols may be applied separately in each of the plurality of geographical regions 104 of the multi-region cloud service 100. The region specific disaster recovery measures and/or protocols applied separately in each geographical region 104 isolated from the other geographical regions 104 may be configured to enable recovery from a disaster, for example, data loss, inaccessible service(s), failed infrastructure and/or the like including private data recovery. In particular, the disaster recovery measures applied separately in each geographical region 104 may enable backup, replication, restoration and/or the like of data including private data stored in one or more databases, buckets and/or other storage resource deployed in the respective geographical region 104 without exposing the private data with resources outside the respective geographical region 104.

According to some embodiments, one or more of the edge proxy servers 106 may be configured to transmit general status data to one or more global monitoring services, applications and/or servers, collectively designated global monitoring services, deployed in one or more of the plurality of geographical regions 104, for example, the primary geographical region 104(1). The global monitoring services may be accessible from at least some of the plurality of geographical regions 104 and typically all of the geographical regions 104. The general status data may exclude private data relating to one or more of the requests received at the respective edge proxy server 106 and/or to one or more of the users 112.

Moreover, one or more of the edge proxy servers 106 may be configured to transmit restricted status data to one or more regional monitoring services deployed in the geographical region 104 in which the respective edge proxy servers 106 is deployed. The regional monitoring service(s) deployed in each geographical region 104 may be inaccessible from all other geographical regions 104. The restricted status data may include private data relating to one or more of the requests received at the respective edge proxy server 106 and/or to one or more of the users 112.

The global and/or regional monitoring service(s) may be implemented, deployed and/or utilized using one or more applications, tools and/or the like.

For example, assuming the edge proxy servers 106 are utilized using a certain ingress controller and/or edge stack, for example, Envoy, the edge proxy servers 106 may transmit and stream Envoy access logs to the centralized global monitoring service(s) and/or to the regional monitoring service(s). Optionally, the Envoy access log format may be configured to include additional information such as, for example, authenticated user ID, regional information, DNS service ID and/or the like. The additional information may enable aggregation of the access logs on a per-region basis in order to identify user activity, for example, at a gateway access log level.

In another example, metrics captured and collected by one or more of the edge proxy servers 106 utilized using Envoy for example, may be stored using Prometheus/Grafana tool which may be configured to generate, based on the collected metrics combined with the Envoy access logs, a dashboard visualizing real-time and/or historic operational parameters and/or insights about the ingress controllers (edge proxy servers 106) across one or more of the geographical regions 104, for example, traffic volume, ingress throughput (Mbps, Gbps, etc.), authentication success/reject ratio, HTTP status code distribution, average compression ratio and more.

In another example, assuming the multi-region cloud service 100 facilitated by the distributed container execution system is deployed using AWS cloud, one or more metrics relating to the cloud platform, specifically to the traffic at the cloud platform, for example, inter-region traffic over Transit Gateways, traffic over intra-region VPC networks and channels, Number of connections at the Load Balancer (NLB) utilizing an edge proxy server 106 and/or the like may be captured and/or measured. These metrics may be then analyzed and/or used to identify one or more patterns, characteristics and/or trends in the network activity, for example, keep track of internal (intra-region) network activity, identify volume of data transferred between geographical regions 104 through regional handover in attempt to reduce the volume of transferred data, and/or the like. Flow Logs may be kept for all VPCs, i.e. for all geographical regions 104 to analyze specific paths that might require applying further diagnostics in the future.

Figure 5A:
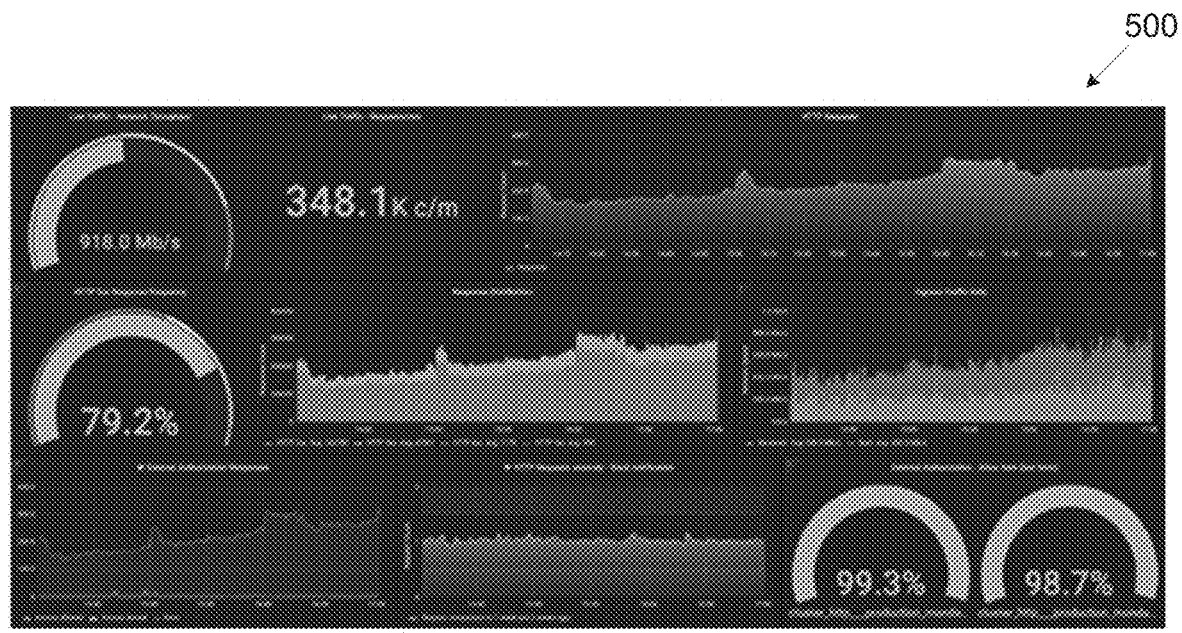
FIG. 5A and FIG. 5B are screenshots of an exemplary dashboard configured to display traffic operational parameters captured across a plurality of geographical regions of a multi-region cloud service, according to some embodiments of the present invention.
Figure 5B:
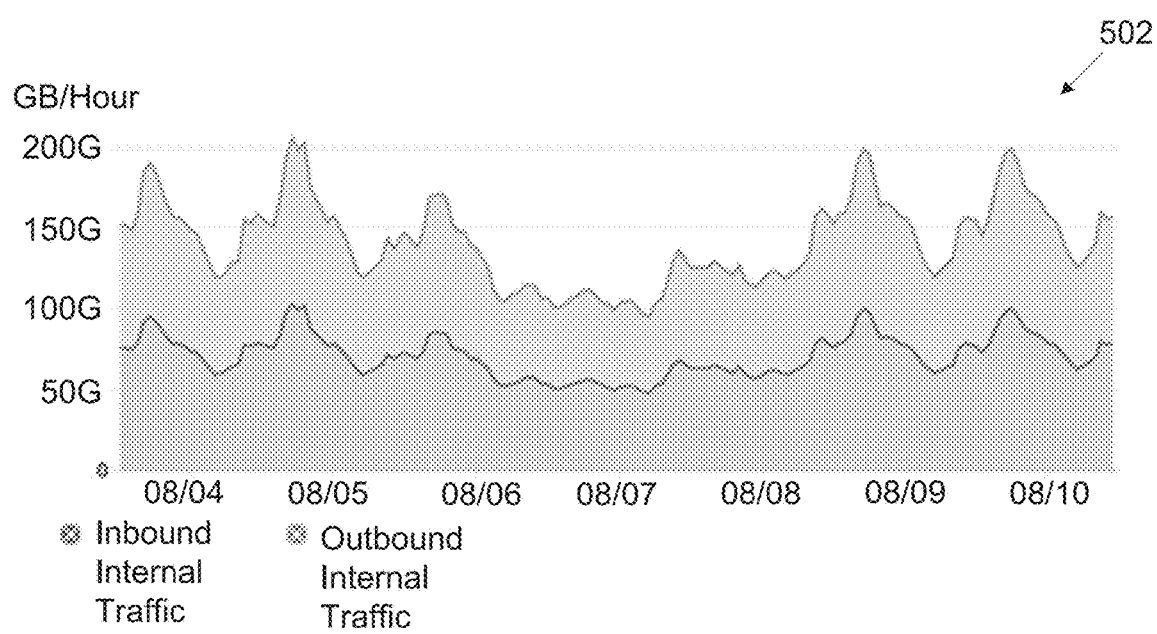

Reference is now made to FIG. 5A and FIG. 5B, which are screenshots of an exemplary dashboard configured to display traffic operational parameters captured across a plurality of geographical regions of a multi-region cloud service, according to some embodiments of the present invention.

A first screenshot 500 of an exemplary Prometheus/Grafana dashboard may display a plurality of real-time and/or historic operational parameters and/or insights about one or more of the ingress controllers such as the edge proxy servers 106, in particular network traffic operational parameters.

A second screenshot 502 may present an of an exemplary AWS cloud network traffic per hour over several days, in particular, inbound internal traffic and outbound internal traffic over one or more VPC networks of the edge proxy servers 106 deployed in a certain geographical region such as the geographical regions 104.

Figure 6:
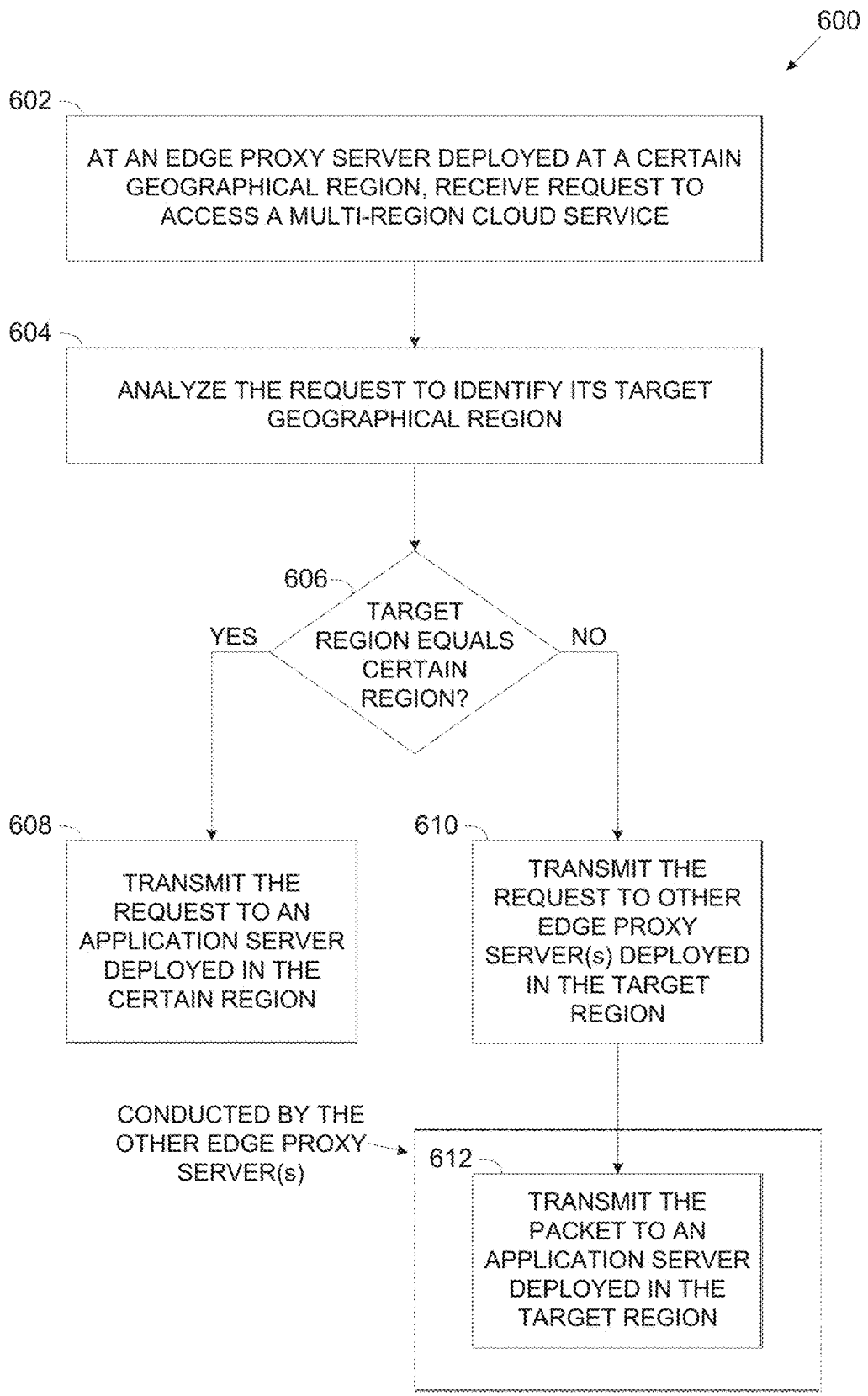
FIG. 6 is a flowchart of an exemplary process of receiving a request received from a user to access a multi-region cloud service and routing the request to its target geographical region, according to some embodiments of the present invention.

Reference is now made to FIG. 6, which is a flowchart of an exemplary process of receiving a request received from a user to access a multi-region cloud service and routing the request to its target geographical region, according to some embodiments of the present invention.

An exemplary process 600 may be executed by one or more edge proxy servers such as the edge proxy servers 106 deployed in a plurality of geographical regions such as the geographical regions 104 of a multi-region cloud service such as the multi-region cloud service 100 optionally facilitated by a distributed container execution system such as the distributed container execution system 102, for example, Kubernetes.

Figure 7:
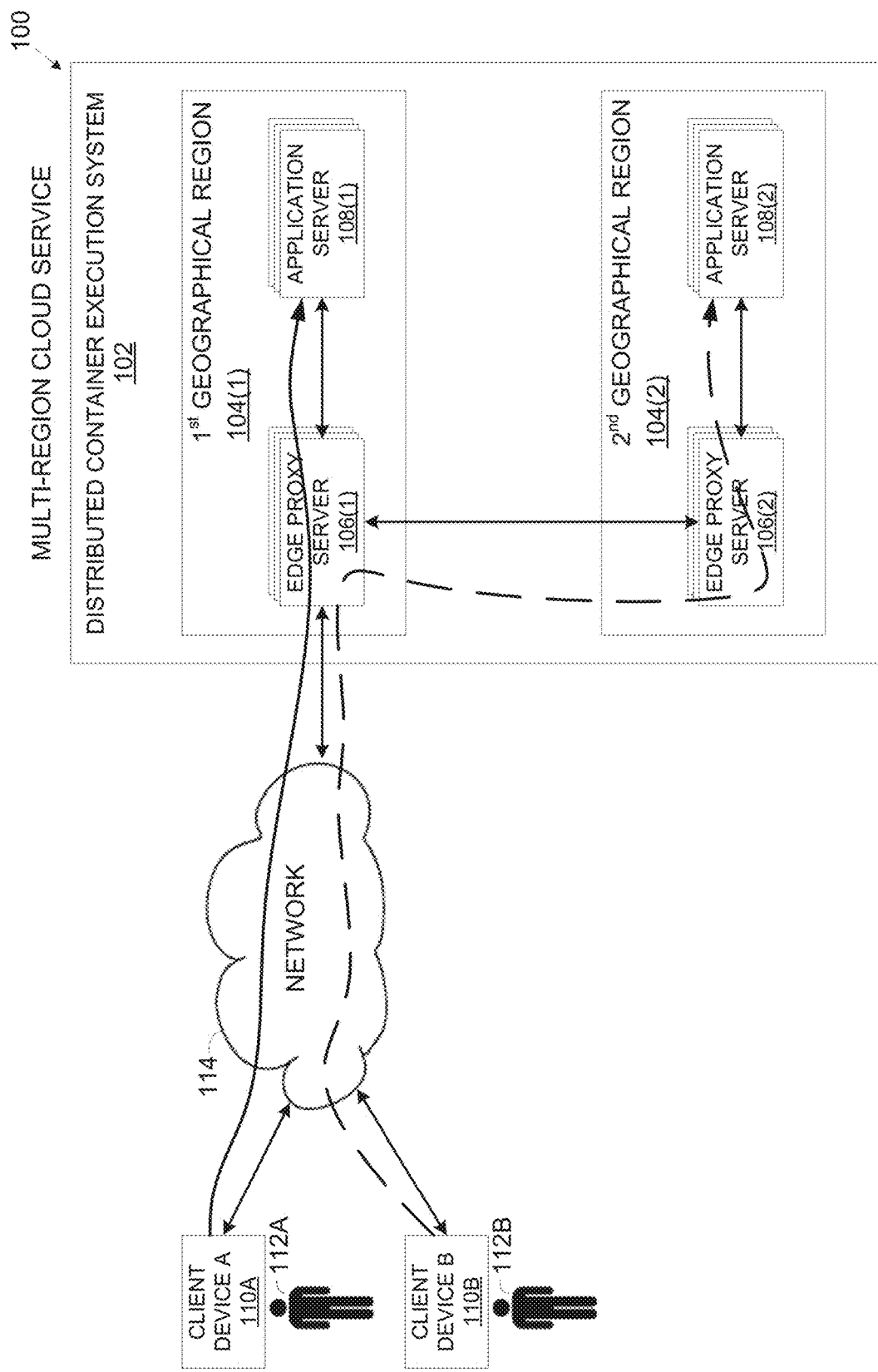
FIG. 7 is a schematic illustration of an exemplary system for receiving a request from a user to access a multi-region cloud service and routing the request to its target geographical region, according to some embodiments of the present invention.

Reference is also made to FIG. 7, which is a schematic illustration of an exemplary system for receiving a request received from a user to access a multi-region cloud service and routing the request to its target geographical region, according to some embodiments of the present invention.

The exemplary process 600 which is further illustrated visually in FIG. 7 is described for managing and routing a single request received from a single client device 110 such as the client device 110 used by a respective user such as the user 112 at a certain one of the plurality of edge proxy servers 106 deployed in a certain geographical region 104 of the multi-region cloud service 100 facilitated by the distributed container execution system 102, for example, Kubernetes distributed over a plurality of geographical regions such as the geographical regions 104. This, however, should not be construed as limiting, since, as may become apparent to a person skilled in the art, the process 600 may be replicated by the edge proxy server 106 deployed in the certain geographical region 104 to manage and route a plurality of requests received at the edge proxy server 106 from the single client device 110 as well as from a plurality of other client devices 110 used by a plurality of other respective users 112 located in the certain geographical region 104. Moreover, the process 600 may be further scaled and duplicated by a plurality of edge proxy servers 106 deployed in a plurality of geographical regions 104 to manage and route a plurality of requests received at the plurality of edge proxy servers 106 from a plurality of client devices 110 used by a plurality of respective uses 112 located in the plurality of geographical regions 104.

Also, for brevity, the certain edge proxy server 106 is described to execute the process 600 while in practice the process 600 may be actually executed by one or more functional modules executed by the certain edge proxy server 106 which may be based on one or more software modules, hardware modules and/or a combination thereof.

As shown at 602, the process 600 starts with the certain edge proxy server 106 deployed in the certain geographical region 104 receiving a request originating from one of a plurality of client devices 110 used by a respective one of a plurality of users 112 to access a service provided by the multi-region cloud service 100, specifically to access the distributed container execution system 102, for example, Kubernetes.

The request originating from the client device 110 may be transmitted to the edge proxy server 106 via one or more wired and/or wireless networks of the network 114 and may be routed via one or more network equipment devices configured to route data packets as known in the art, for example, a gateway, a router, a switch, a proxy server, a reverse proxy server and/or the like.

Since it is deployed at the edge of the cloud service 100 in the certain geographical region 104, the certain edge proxy server 106 connected to the network 114 of the certain geographical region 104 may typically receive requests originating from client devices 110 located in the same certain geographical region 104, i.e., in the certain geographical region 104.

Each of the plurality of users 112 may be associated with a receptive one of the plurality of geographical regions 104. For example, one or more of the users 112 may have an account which may indicate the geographical region 104 of the respective use 112. In another example, one or more of the users 112 may be a member of a group, for example, a company, an organization, an authority, a community, and/or the like which is located in a certain geographical region 104.

As shown at 604, the edge proxy server 106 may analyze the received request to identify a target geographical region 104 of the request, in particular the geographical region 104 associated with the user 112 using the originating client device 110 from which the request is transmitted.

The edge proxy server 106 may apply and/or use one or more methods, techniques and/or algorithms identify the target geographical region 104 of the request.

For example, the edge proxy server 106 may be configured to determine the target geographical region 104 of the request based on geographical routing information relating to the user 112 which may be extracted from the request. The geographical routing information may be derived from account information of the user 112 using the originating client device 110.

One or more methods and/or implementations may be applied to insert and/or include the geographical routing information and/or part thereof in the request. Specifically, the geographical routing information may be provided to the originating client device 110 which may be configured to include the geographical routing information relating to the user 112 in each request transmitted to the distributed container execution system 102 facilitating the multi-region cloud service 100.

For example, the geographical routing information may be transmitted to the client device 112 during a login process of the user 112 to the multi-region cloud service 100 in which the user 112 may be verified and/or authenticated. During the login process, the account of the user 112 and/or the account of the group in which the user 112 is a member may be accessed to retrieve the geographical routing information relating to the user 112. As such, during the logic process, following successful authentication of one or more login requests transmitted by the client device 110 to the in the distributed container execution system 102, one or more data items indicative of and/or comprising at least part of the geographical routing information of the user 112 may be delivered to the client device 110. For example, one or more cookies comprising at least part of the geographical routing information of the user 112 may be installed in a web browser executed by the client device 110 to access and browse through one or more webpages of the service accessed at the multi-region cloud service 100. Each subsequent request originating from the client device 110 used by the user 112 may therefore include at least some of the geographical routing information relating to the user 112 extracted from the cookie(s) previously installed in the client device 110. The edge proxy server 106 may be configured to extract the geographical routing information from each subsequent request and determine its target geographical region 104 accordingly.

In another example, the geographical routing information may be indicated by an identifier (ID) uniquely identifying the originating client device 110 used by the user 112, for example, a serial number, a Media Access Controller (MAC) address and/or the like. Each request originating from the client device 110 may include the ID of the client device 110. The edge proxy server 106 may be configured to extract the ID of the client device 110 from each request received from the client device 110 and may determine the target geographical region 104 of the respective request based on one or more log records, for example, a database, a table, a list, a file and/or the like associating between IDs of one or more client devices 110 and respective target geographical regions 104.

As shown at 606, which is a conditional step, in case the target geographical region 104 of the received request is the certain geographical region 104 in which the certain edge proxy server 106 is deployed, the process 600 may branch to 608. However, in case the target geographical region 104 of the request is not (i.e. different from) the certain geographical region 104 in which the certain edge proxy server 106 is deployed, the process 600 may branch to 610.

As shown at 608, since the target geographical region 104 of the received request is the certain geographical region 104, the edge proxy server 106 may transmit (forward) the received request to one or more of the application (backend) servers 108 deployed in the certain geographical region 104.

The edge proxy server 106 may transmit the request to the application server(s) 108 via one or more of the cloud intra-region networks facilitated by the distributed container execution system 102, for example, a VPC network configured to connect and support communication within the certain geographical region 104.

As shown at 610, since the target geographical region 104 of the received request is not the certain geographical region 104, the edge proxy server 106 may transmit (forward) the received request to one or more other edge proxy servers 106 deployed in the target geographical region 104.

The edge proxy server 106 may transmit the request to the other edge proxy server(s) 106 via one or more of the cloud inter-region networks and/or channels facilitated by the distributed container execution system 102, for example, a peering connection, a tunnel, a VPN connection and/or the one or more of the VPC network(s) deployed to support communication within the certain geographical region 104.

The edge proxy server 106 may be configured to determine a destination for transmitting the received request based on one or more routing rules. Using the routing rules may apply for both transmitting requests to application server(s) 108 deployed in the same geographical region 104 and to requests transmitted to edge proxy server(s) 106 deployed in other geographical regions 104. The routing rules may be based on predefined fixed settings, dynamic settings and/or a combination thereof.

For example, a certain routing rule may define that in case a request is directed to a global application (service) executed by one or more application servers 108 deployed in a certain geographical region 104, for example, the primary geographical region 104, the proxy edge server 106 may transmit the request to one of a plurality of proxy edge servers 106 deployed in the primary geographical region 104. In another example, a certain routing rule may define that the edge proxy server 106 may transmit each request targeting the certain geographical region 104 to a certain predefined application server 108 deployed in the certain geographical region 104. In another example, a certain routing rule may define that the edge proxy server 106 should apply load balancing and transmit requests targeting the certain geographical region 104 to one of a plurality of application servers 108 which are least loaded by other requests. In another example, a certain routing rule may define that the edge proxy server 106 may transmit requests directed to a target geographical region 104 different (other) from the certain geographical region 104 to one of a plurality of proxy edge servers 106 deployed in the target geographical region 104 according to one or more attributes of each request, for example, a type of target service, a type of requested data, part of a group of requests and/or the like. In another example, a certain routing rule may define priorities for at least some requests. In such case, the proxy edge server 106 may transmit received requests according to their priority.

As shown at 612, which is executed by the other edge proxy server 106 deployed in the target geographical region 104 of the request, the other edge proxy server 106 may execute the process 600 to analyze the received request and identify the target geographical region 104 of the request. Naturally, in such case, the other edge proxy server 106 will find and determine accordingly that the target geographical region 104 of the request is the geographical region 104 in which it (i.e., the other edge proxy server 106) is deployed.

As seen in FIG. 7 illustrating the process 600, the certain edge proxy server 106 designated 106(1) deployed in the certain geographical region designated 104(1) may receive requests transmitted by or more client devices 110 located in the certain geographical region 104(1), for example, a client device 110A used by a respective user 112A and client device 110B used by a respective user 112B via the network 114 deployed in the certain geographical region 104(1).

It is assumed that the target geographical region of the user 112A is the certain geographical region 104(1) in which the certain edge proxy server 106(1) and one or more application servers 108, for example, an application server 108(1) are deployed. It is further assumed that the target geographical region of the user 112B is another geographical region 104 designated 104(2) in which another edge proxy server 106 designated 106(2) and one or more other application servers 108 designated 108(2) are deployed.

The certain edge proxy server 106(1) executing he process 600 for requests received from the client device 110A used by the user 112A may therefore determine, based on the geographical routing information extracted from each request, that the target geographical region of the request(s) is the certain geographical region 104(1) and may therefore transmit the request(s) to the application server 108(1)

deployed in the certain geographical region 104(1). The path of the request(s) originating from the client device 110A is marked by the solid line.

However, when analyzing the geographical routing information extracted from requests received from the client device 110B used by the user 112B, the certain edge proxy server 106(1) may therefore determine that the target geographical region of the request(s) is the geographical region 104(2) and may therefore transmit the request(s) to the other edge proxy server 106(2) deployed in the geographical region 104(2). The other edge proxy server 106(2) which may also execute the process 600, may determine that the target geographical region of the request(s) originating from the client device 110B is the geographical region 104(2) and may thus transmit these request(s) to the other application server 108(2). The path of the request(s) originating from the client device 110B is marked by the dashed line.

As evident, each of the edge proxy servers 106 may be thus capable of receiving and routing (forwarding) requests received directly from one or more of the client devices 110 and/or received from one or more other edge proxy servers 106, typically edge proxy servers 106 deployed in other geographical regions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms virtualization, container, container execution system, VPC, cloud intra-region network, and cloud inter-region network are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A multi-region cloud service, comprising:
   a distributed container execution system comprising a plurality of edge proxy servers deployed in a plurality of geographical regions to receive, via at least one network, a plurality of requests to access the distributed container execution system from a plurality of client devices, and a plurality of application servers deployed in the plurality of geographical regions to provide the cloud service, each of the plurality of application servers is communicatively coupled to at least one of the plurality of edge proxy servers deployed in the same geographical region;

wherein each of the plurality of edge proxy servers is configured to:
analyze each request received at the respective edge proxy server to identify a target geographical region of the respective request;
transmit the respective request to at least one of the plurality of application servers deployed in a same geographical region as the respective edge proxy server in case the target geographical region is the geographical region of the respective edge proxy server; and
transmit the respective request to at least one other edge proxy server deployed in the target geographical region in case the target geographical region is not the geographical region of the respective edge proxy server
wherein the respective edge proxy server is configured to determine the target geographical region of the respective request based on geographical routing information extracted from the respective request, the geographical routing information is derived from account information of a user using at least one of the plurality of client devices from which the respective request originates;
wherein the geographical routing information is extracted from at least one cookie previously installed in the at least one client device.

2. The multi-region cloud service of claim 1, wherein the respective edge proxy server comprises an ingress controller configured to manage access to the distributed container execution system.

3. The multi-region cloud service of claim 1, wherein the respective edge proxy server is communicatively coupled to at least one of the plurality of application servers deployed in the same geographical region via at least one Virtual Private Cloud (VPC) network facilitated by the distributed container execution system.

4. The multi-region cloud service of claim 1, wherein the respective edge proxy server is communicatively coupled to the at least one other edge proxy server deployed in a different geographical region via at least one peering connection facilitated by the distributed container execution system.

5. The multi-region cloud service of claim 1, wherein the distributed container execution system is deployed using at least one cloud computing platform.

6. The multi-region cloud service of claim 1, wherein the application servers in each of the plurality of geographical regions are configured to access regional storage resources deployed in the respective geographical region for storing region specific data relating to the respective geographical region and are inaccessible from other geographical regions.

7. The multi-region cloud service of claim 1, wherein each application server deployed in each of the plurality of geographical regions is configured to execute at least one application of a group consisting of: at least one regional application, at least one distributed application, and at least one global application, the at least one regional application fully deployed in at least one application server of the respective geographical region and not sharing data with other geographical regions, the at least one distributed application fully deployed in at least one application server of the respective geographical region and sharing non-private data with at least one of other geographical region, the at least one global application deployed in a single geographical region of the plurality of geographical regions and accessible from other geographical regions.

8. The multi-region cloud service of claim 1, wherein the at least one application is deployed in the distributed container execution system according to at least one deployment protocol which is a member of a group comprising: manual per-region deployment, manual all at once deployment, gated Canary deployment, and full Canary deployment.

9. The multi-region cloud service of claim 1, wherein at least one application server deployed in each of the plurality of geographical regions is configured to use at least one secret of a group comprising: at least one global secret, and at least one regional secret, the at least one global secret is used by application servers deployed in at least some of the plurality of geographical regions, the at least one regional secret is used exclusively by the at least one application server.

10. The multi-region cloud service of claim 9, wherein the at least one global secret is stored in a global secret store deployed in a primary geographical region of the plurality of geographical regions and replicated to a regional secret store deployed in each of the at least some geographical regions, the at least one regional secret is stored in the global secret store and replicated exclusively to the regional secret store of the respective geographical region.

11. The multi-region cloud service of claim 10, wherein only the global secret store is accessible for updating the at least one global secret and/or the at least one regional secret.

12. The multi-region cloud service of claim 1, further comprising applying disaster recovery measures separately in each of the plurality of geographical regions, the disaster recovery measures are configured to enable data recovery without exposing private data to resources outside the respective geographical region.

13. The multi-region cloud service of claim 1, wherein the respective edge proxy server is configured to transmit general status data excluding private data relating to at least some of the requests received at the respective edge proxy server to at least one global monitoring service deployed in at least one of the plurality of geographical regions and accessible from at least some of the plurality of geographical regions.

14. The multi-region cloud service of claim 1, wherein the respective edge proxy server is configured to transmit restricted status data comprising private data relating to at least some of the requests received at the respective edge proxy server to at least one regional monitoring service deployed in the geographical region of the respective edge proxy server and inaccessible from all other geographical regions.

15. The multi-region cloud service of claim 1, wherein each of the plurality of edge proxy servers is configured to determine a destination for transmitting the respective request based on at least one routing rule.

16. The multi-region cloud service of claim 1, wherein the at least one cookie is installed in the at least one client device during authentication of a login request transmitted by the at least one client device to the distributed container execution system.

17. A method of managing requests to a multi-region cloud service, comprising:
using at least one edge proxy server of a distributed container execution system of a multi-region cloud service comprising a plurality of edge proxy servers deployed in a plurality of geographical regions to receive, via at least one network, a plurality of requests to access the distributed container execution system from a plurality of client devices, and a plurality of application servers deployed in the plurality of geographical regions provide the cloud service, each of the plurality of application servers is communicatively coupled to at least one of the plurality of edge proxy servers deployed in the same geographical region, the at least one edge proxy server deployed at a certain one of the plurality of geographical region is configured for:

receiving, via at least one network, at least one request to access the distributed container execution system;

analyzing the at least request to determine a target geographical region of the at least one request;

transmitting the at least one request to at least one application server of the multi-region cloud service deployed in the certain region in case the target geographical region is the certain geographical region; and transmitting the at least one request to at least one other edge proxy server deployed the target geographical region in case the target geographical region is not the certain geographical region, the at least one other edge proxy server is configured to transmit the at least one request to at least one application server deployed in the target geographical region;

wherein the respective edge proxy server is configured to determine the target geographical region of the respective request based on geographical routing information extracted from the respective request, the geographical routing information is derived from account information of a user using at least one of the plurality of client devices from which the respective request originates;

wherein the geographical routing information is extracted from at least one cookie previously installed in the at least one client device.

* * * * *